United States Patent
Takehara

(10) Patent No.: US 11,445,212 B2
(45) Date of Patent: *Sep. 13, 2022

(54) MOVING PICTURE DECODING DEVICE, MOVING PICTURE DECODING METHOD, AND MOVING PICTURE DECODING PROGRAM

(71) Applicant: JVCKENWOOD Corporation, Yokohama (JP)

(72) Inventor: Hideki Takehara, Yokohama (JP)

(73) Assignee: JVCKENWOOD Corporation, Yokohama (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/140,549

(22) Filed: Jan. 4, 2021

(65) Prior Publication Data

US 2021/0127130 A1 Apr. 29, 2021

Related U.S. Application Data

(63) Continuation of application No. 16/558,604, filed on Sep. 3, 2019, now Pat. No. 10,911,774, which is a
(Continued)

(30) Foreign Application Priority Data

Apr. 27, 2011 (JP) .................................. 2011-100030
Apr. 27, 2011 (JP) .................................. 2011-100031
(Continued)

(51) Int. Cl.
*H04N 19/52* (2014.01)

(52) U.S. Cl.
CPC .................................. *H04N 19/52* (2014.11)

(58) Field of Classification Search
CPC ....................................................... H04N 19/52
See application file for complete search history.

(56) References Cited

U.S. PATENT DOCUMENTS

| 7,394,853 B2 | 7/2008 | Kondo et al. |
| 2010/0118969 A1* | 5/2010 | Kondo .................. H04N 19/51 |
| | | 375/E7.125 |

(Continued)

FOREIGN PATENT DOCUMENTS

| JP | 2004-072712 A | 3/2004 |
| JP | 2004-096705 A | 3/2004 |

(Continued)

OTHER PUBLICATIONS

Benjamin Bross, Joel Jung, BoG report of CE9: MV Coding and Skip/Merge operations, Mar. 16-23, 2011, Joint CollaborativeTeam on Video Coding (JCT-VC) of ITU-T SG16 WP3 and ISO/IEC JTC1/SC29/WG11.

(Continued)

*Primary Examiner* — Hesham K Abouzahra
(74) *Attorney, Agent, or Firm* — Brundidge & Stanger, P.C.

(57) ABSTRACT

A motion vector decoding unit derives a motion vector of a prediction block subject to decoding on the basis of a motion vector of a candidate block included in candidate blocks selected from neighboring blocks. The motion compensation prediction unit performs motion compensation prediction using the derived motion vector. In case a motion vector number of a first block and a motion vector number of a second block are identical with each other, the motion vector decoding unit determines whether or not to set the second block as a candidate block in accordance with whether or not a reference index indicating a reference picture that the motion vector of the first block refers to and a reference (Continued)

index indicating a reference picture that the motion vector of the second block refers to are identical with each other.

6 Claims, 14 Drawing Sheets

Related U.S. Application Data continuation of application No. 14/063,924, filed on Oct. 25, 2013, now Pat. No. 10,425,657, which is a continuation of application No. PCT/JP2012/002840, filed on Apr. 25, 2012.

(30) Foreign Application Priority Data

Apr. 24, 2012 (JP) ................................. 2012-098924
Apr. 24, 2012 (JP) ................................. 2012-098925

(56) References Cited

U.S. PATENT DOCUMENTS

| | | | |
|---|---|---|---|
| 2012/0163466 A1 | 6/2012 | Sugio | |
| 2012/0224637 A1* | 9/2012 | Sugio | H04N 19/44 |
| | | | 375/E7.243 |
| 2013/0114727 A1 | 5/2013 | Sato | |
| 2021/0274162 A1* | 9/2021 | Ahn | H04N 19/543 |

FOREIGN PATENT DOCUMENTS

| | | |
|---|---|---|
| JP | 2006-352910 A | 12/2006 |
| JP | 2010-283865 A | 12/2010 |

OTHER PUBLICATIONS

Notification of Reason(s) for Refusal in Japanese Patent Application No. 2012-098924, dated Aug. 18, 2015.
Notification of Reason(s) for Refusal in Japanese Patent Application No. 2012-098925, dated Aug. 18, 2015.
International Search Report in PCT International Application No. PCT/JP2012/002840, dated Aug. 21, 2012.
International Preliminary Report on Patentability and Written Opinion in PCT International Application No. PCT/JP2012/002840, dated Oct. 29, 2013.

* cited by examiner

MOVING PICTURE DECODING DEVICE, MOVING PICTURE DECODING METHOD, AND MOVING PICTURE DECODING PROGRAM

CROSS-REFERENCE TO RELATED APPLICATIONS

This application is a continuation of U.S. Ser. No. 16/558,604, filed Sep. 3, 2019; which is a continuation of Ser. No. 14/063,924, filed Oct. 25, 2013, now U.S. Pat. No. 10,425,657; which is a continuation of International Application No. PCT/JP2012/002840, filed Apr. 25, 2012; which claims the benefit of Japanese Application Nos. 2012-098925, filed Apr. 24, 2012; 2012-098924, filed Apr. 24, 2012; 2011-100031, filed Apr. 27, 2011; 2011-100030, filed Apr. 27, 2011, the entire disclosure of which is incorporated herein by reference.

BACKGROUND OF THE INVENTION

1. Field of the Invention

The present invention generally relates to picture decoding technology utilizing motion compensation prediction, and more particularly, to a technology for deriving a motion vector to be used in the motion compensation prediction.

2. Description of the Related Art

In picture compression-encoding, motion compensation prediction is typically used in order to increase compression efficiency by using correlation between pictures over time. According to motion compensation prediction, a predicted value is derived from a reference picture by taking the direction and quantity of motion indicated by a motion vector into account. By encoding a difference value between the predicted value derived from the motion compensation prediction and a pixel value of a picture subject to encoding, redundancy is removed and compression efficiency can be increased.

By MPEG-4AVC or the like, which is the latest picture compression-encoding technology, one picture is encoded as an I picture, a P picture, or a B picture. An I picture is encoded by information on the picture itself. To a P picture, a unidirectional motion compensation prediction can be applied. To a B picture, a bidirectional motion compensation prediction can be applied.

In case of encoding a motion vector of a certain block subject to encoding, a motion vector predictor is derived from one or more neighboring blocks, firstly. Then a motion vector difference between the motion vector of the certain block subject to encoding and the motion vector predictor is calculated, and the motion vector difference is entropy encoded. The reason for deriving a motion vector predictor from one or more neighboring blocks is that the motion vector of the block subject to encoding is considered to have a correlation with the motion vector of the neighboring block(s). The entropy encoding technique utilizes this correlation to compress pictures so that the smaller the absolute value of a motion vector difference is, the higher the compression efficiency of the motion vector is.

A method for predicting a motion vector by using one or more blocks neighboring a block subject to encoding is disclosed in the patent document 1.

RELATED ART LIST

Patent Document

[Patent Document 1] Japanese Patent Application Publication No. 2004-96705

According to the conventional motion vector coding method described above, a motion vector predictor is derived for each prediction direction (i.e., direction to the previous picture, direction to the subsequent picture, or the like). Therefore, in case that a motion of an object having a time correlation different from that of a motion of a block subject to encoding exists in a neighboring block, sometimes a motion vector predictor that is irrelevant to the original motion of an object in the block subject to encoding is derived and the compression efficiency of the motion vector is not improved.

SUMMARY OF THE INVENTION

The present invention addresses the aforementioned issue, and a purpose thereof is to provide a motion vector encoding technology and a motion vector decoding technology that can improve the compression efficiency of a motion vector at encoding and improve the accuracy of motion vector derivation at decoding.

In order to address the aforementioned issues, a moving picture decoding device adapted to decode a bitstream encoded by using motion compensation prediction in units of blocks obtained by partitioning each picture of moving pictures is provided in accordance with an aspect of the invention. The device includes: a motion information derivation unit (550) configured to derive a motion vector of a prediction block subject to decoding on the basis of a motion vector of a candidate block included in candidate blocks selected from neighboring blocks of the prediction block subject to decoding; and a motion compensation prediction unit (530) configured to generate a prediction signal of the prediction block subject to decoding by motion compensation prediction using the motion vector derived by the motion information derivation unit. The motion information derivation unit (550) determines, in case a motion vector number of a first block and a motion vector number of a second block are identical with each other, whether or not to set the second block as a candidate block in accordance with whether or not a reference index indicating a reference picture that a motion vector of the first block refers to and a reference index indicating a reference picture that a motion vector of the second block refers to are identical with each other.

According to another aspect of the invention, a moving picture decoding method adapted to decode a bitstream encoded by using motion compensation prediction in units of blocks obtained by partitioning each picture of moving pictures is provided. The method includes: deriving a motion vector of a prediction block subject to decoding on the basis of a motion vector of a candidate block included in candidate blocks selected from neighboring blocks of the prediction block subject to decoding; and generating a prediction signal of the prediction block subject to decoding by motion compensation prediction using the derived motion vector. In case a motion vector number of a first block and a motion vector number of a second block are identical with each other, the deriving determines whether or not to set the second block as a candidate block in accordance with whether or not a reference index indicating a reference picture that a motion vector of the first block refers to and a reference index indicating a reference picture that a motion vector of the second block refers to are identical with each other.

Optional combinations of the aforementioned constituting elements, and implementations of the invention in the form of methods, apparatuses, systems, recording mediums, computer programs, or the like may also be practiced as additional modes of the present invention.

DETAILED DESCRIPTION OF THE INVENTION

Figure 1A:
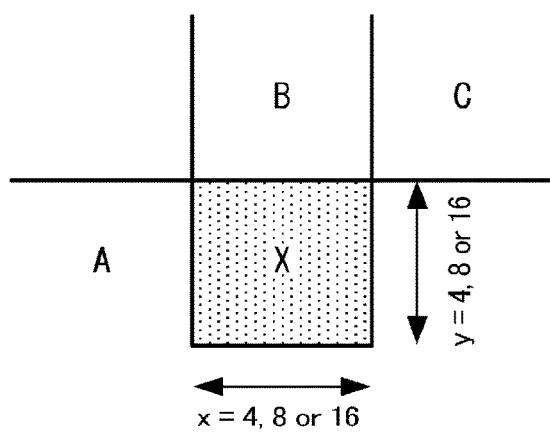
FIGS. 1A and 1B illustrate a relation between a block subject to encoding and neighboring blocks.

The invention will now be described by reference to the preferred embodiments. This does not intend to limit the scope of the present invention, but to exemplify the invention.

First, an explanation will be given on technologies, which the embodiments of the invention presuppose.

Devices and systems that comply with a coding method such as Moving Picture Experts Group (MPEG) or the like have become popular nowadays. According to such coding methods, a plurality of pictures consecutive along the time axis is processed as information in the form of digital signals. In this process, the information is compressed and encoded by using motion compensation prediction that utilizes redundancy in time and by using orthogonal transformation (e.g., discrete cosine transformation or the like) that utilizes redundancy in space in order to broadcast, to transmit, or to store the information with high efficiency.

In 1995, the MPEG-2 video (ISO/IEC 13818-2) coding method was established as a general purpose picture compression-coding method. The MPEG-2 video coding method has been widely used for a storage medium (e.g., a Digital Versatile Disk (DVD), magnetic tape for digital VTR complying with D-VHS (a registered trademark) standard), and for an application for digital broadcasting or the like.

Further in 2003, a coding method referred to as MPEG-4 AVC/H.264 (a standard number 14496-10 is accredited by ISO/IEC and a standard number H.264 is accredited by ITU-T. Herein after this coding method is referred to as "MPEG-4AVC") is adopted as an international standard by cooperative activity of the Joint Technical Committee (ISO/IEC) of the International Organization for Standardization (ISO) and the International Electrotechnical Commission (IEC), and the International Telecommunication Union telecommunication Standardization Sector (ITU-T).

In these coding methods, motion compensation prediction is used. According to the motion compensation prediction, a predicted value is derived from a reference picture by taking the direction and quantity of motion indicated by a motion vector into account. By encoding a difference value between the predicted value derived by the motion compensation prediction and a pixel value of a picture subject to encoding, redundancy is removed and compression efficiency can be improved.

Pictures are classified into three types in accordance with a method of using motion compensation prediction. The three types of pictures are: an I picture that does not use motion compensation prediction; a P picture to which unidirectional motion compensation prediction can be applied; and a B picture to which bidirectional motion compensation prediction can be applied.

For a P picture of MPEG-2, motion compensation prediction is performed in units of macroblocks by using a I picture or a P picture that is right before the P picture in the display order as a reference picture. In contrast, according to MPEG-4AVC, a plurality of encoded pictures can be used as reference pictures, and a most appropriate picture can be chosen from the plurality of encoded pictures for each prediction block (an explanation will be given later) so as to perform motion compensation prediction. In addition to a picture that precedes in the display order, a picture that follows in the display order can also be referred to.

For a B picture of MPEG-2, one of three types of motion compensation prediction can be performed: motion compensation prediction using one reference picture previous in the display order; motion compensation prediction using one reference picture subsequent in the display order; or motion compensation prediction performed by averaging the two reference pictures. In contrast, according to MPEG-4AVC, a reference picture is not limited to one previous picture and/or one subsequent picture in the display order, but an arbitrary reference picture can be used for motion compensation prediction regardless of the previous picture or subsequent picture. Further, a B picture can also be referred to as a reference picture.

In this manner, according to MPEG-4AVC, an arbitrary encoded picture can be referred to. Therefore, a decoded picture is stored in a reference frame memory so as to be managed.

According to MPEG-4AVC, a reference picture list is constructed by arranging pictures stored in the reference frame memory in a predetermined manner, and a reference picture is designated by describing the index thereof in the bitstream thereof. The "reference picture list" is a list where reference pictures in a reference frame that is used for motion compensation prediction can be rearranged. By rearranging reference pictures in accordance with a frequency of usage by using the reference picture list, encoding efficiency can be improved.

Further, for the reference picture list, the list described above can be rearranged by sending information on the change of reference picture list in a slice header attached for each slice.

According to motion compensation prediction with MPEG-4AVC, an encoded picture registered in the reference picture list is set as a reference picture in units of blocks, and a predicted value is calculated from the reference picture by taking the direction and quantity of motion indicated by a motion vector into account.

Reference picture lists are provided for two directions. That is, a reference picture list L0 that generally registers an encoded picture that is previous to a picture subject to encoding in time, and a reference picture list L1 that generally registers an encoded picture that is subsequent to the picture subject to encoding in time. The reference picture list L0 is used for a P picture, and the reference picture list L0 and the reference picture list L1 are used for a B picture.

The direction of motion compensation prediction based on the reference picture list L0 is referred to as a direction 0, and a direction of motion compensation prediction based on the reference picture list L1 is referred to as a direction 1.

An explanation will be given on a prediction block. A picture is first divided in units of macroblocks (hereinafter "MB") of 16 pixels horizontally by 16 pixels vertically. A macroblock is further divided into one or more prediction blocks of 16 pixels horizontally by 16 pixels vertically, 16 pixels horizontally by 8 pixels vertically, 8 pixels horizontally by 16 pixels vertically, 8 pixels horizontally by 8 pixels vertically, 8 pixels horizontally by 4 pixels vertically, 4 pixels horizontally by 8 pixels vertically, or 4 pixels horizontally by 4 pixels vertically.

One motion vector that indicates the direction of motion and the quantity of motion and one reference index that indicates a reference picture in a reference picture list are assigned to a prediction block of a P picture. One motion vector that indicates the direction of motion and the quantity of motion and one reference index that indicates a reference picture in a reference picture list, or two motion vectors and two reference indices are assigned to a prediction block of a B picture.

For a prediction block to which one motion vector and one reference index are assigned (herein after referred to as "unidirectional prediction"), the pixel value of a reference picture indicated by the motion vector and the reference index is set as a predicted value. In contrast, for a prediction block to which two motion vectors and two reference indices are assigned (herein after referred to as "bidirectional prediction"), an average value of the pixel values of reference pictures indicated by the motion vectors and the reference indices respectively is set as a predicted value.

Next, an explanation will be given on a method for deriving a motion vector predictor according to Patent document 1 or MPEG-4AVC as a conventional method for predicting a motion vector while referring to FIG. 1A, FIG. 1B, and FIG. 2. A "block" refers to a "prediction block" in the following explanation unless otherwise indicated.

Figure 2:
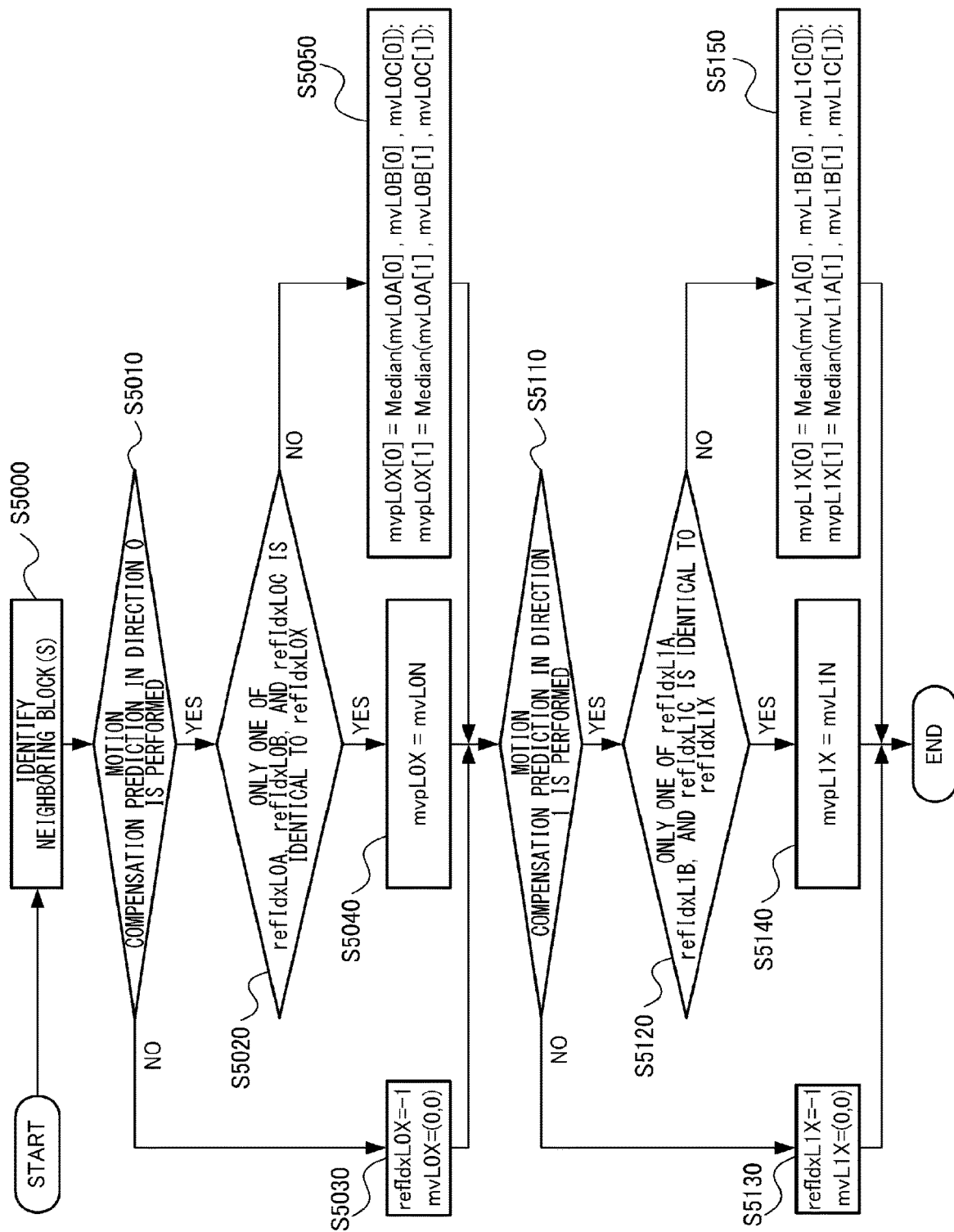
FIG. 2 shows a flowchart for illustrating a conventional method for predicting a motion vector.

A Block A, a block B, and a block C that are blocks neighboring the block X subject to encoding are determined as shown in FIG. 1A (step S5000). With respect to block A, the reference index in the direction 0 is defined as refIdxL0A, the motion vector in the direction 0 is defined as mvL0A, the reference index in the direction 1 is defined as refIdxL1A, and the motion vector in the direction 1 is defined as mvL1A. In a similar manner, refIdxL0B, mvL0B, refIdxL1B, and mvL1B for block B, and refIdxL0C, mvL0C, refIdxL1C, and mvL1C for block C are defined.

Whether or not motion compensation prediction in the direction 0 is performed for the block X subject to encoding is examined (step S5010).

In case that motion compensation prediction in the direction 0 is not performed (NO in step S5010), with respect to the block X subject to encoding in the direction 0, the reference index refIdxL0X is set as −1, and the motion vector mvL0X is set as (0, 0) (step S5030).

In case that motion compensation prediction in the direction 0 is performed (YES in step S5010), it is examined whether only one of three reference indices (i.e., refIdxL0A, refIdxL0B, and refIdxL0C) of the neighboring blocks A, B, and C in the direction 0, is identical to refIdxL0X, which is the reference index of the block X subject to encoding (step S5020). In case that there exists only one neighboring block of which the reference index is identical to that of the block X subject to encoding (YES in step S5020), the motion vector mvL0N of the neighboring block N is set as a motion vector predictor mvpL0X of the block X subject to encoding (step S5040).

In case that no neighboring block exists of which the reference index is identical to that of the block X subject to encoding, or in case more than one neighboring blocks exist of which the reference index is identical to that of the block X (NO in step S5020), median values of respective elements of the motion vectors mvL0A, mvL0B, and mvL0C in the direction 0 of the neighboring blocks A, B, and C are set as the motion vector predictor mvpL0X as shown in the equation 1 (step S5050).

$$mvpL0X(x) = \mathrm{Median}[mvL0A(x), mvL0B(x), mvL0C(x)]$$

$$mvpL0X(y) = \mathrm{Median}[mvL0A(y), mvL0B(y), mvL0C(y)] \quad \text{[equation 1]}$$

A similar process is also performed for motion compensation prediction in the direction 1 for the block X subject to encoding (step S5110-step S5150).

An explanation will be given on problems of the conventional method described above. In accordance with the conventional method for predicting a motion vector, a transient value of motion vector predictor is avoided by using a median filter. However, a median filter has a problem that a most efficient motion vector can not be used as a predicted value.

Therefore, the conventional method for predicting a motion vector introduces a scheme before the median filter. According to the scheme, in case that only one neighboring block having a reference index identical to that of the block subject to encoding exists for each prediction direction, the motion vector of the neighboring block is preferentially set as the motion vector predictor.

Since a motion vector typically depends on the motion of an object, the motion of the object has a correlation in the time direction. However, according to the conventional method for predicting a motion vector, whether the reference index of a block subject to encoding and the reference index of a neighboring block are identical with each other is checked for each prediction direction independently. Therefore, in case that a motion of an object having a time correlation different from that of a motion of a block subject to encoding exists in a neighboring block, a problem exists that the original motion of the block subject to encoding can not be predicted correctly.

An explanation will be given on a problem of such a conventional method for predicting a motion vector with a specific example while referring to FIG. 3.

The positions of the neighboring block A, block B, and block C with respect to a block X subject to encoding in a picture subject to encoding is as shown in the figure. Since a same object exists in the block X subject to encoding and in the block B, bidirectional prediction using a previous reference picture P0 and a subsequent reference picture P1 is used for the block X subject to encoding and for the block B. On the other hand, an object including the block C has a strong correlation with the previous reference picture P0, and unidirectional prediction is used. An object including the block A has a strong correlation with the subsequent reference picture P1, and unidirectional prediction is used.

For the block X subject to encoding, motion compensation prediction where the motion vector is (−8, 8) with respect to the reference picture P0 is performed, and motion compensation prediction where the motion vector is (8, −8) with respect to the reference picture P1 is performed. For the block A, motion compensation prediction where the motion vector is (0, 0) with respect to the reference picture P1 is performed. For the block B, motion compensation prediction where the motion vector is (−8, 8) with respect to the reference picture P0 is performed, and motion compensation prediction where the motion vector is (8, −8) with respect to the reference picture P1 is performed. For the block C, motion compensation prediction where the motion vector is (0, 0) with respect to the reference picture P0 is performed.

In this example, '0' in the reference index in the direction 0 indicates the reference picture P0, and '0' in the reference index in the direction 1 indicates the reference picture P1.

With respect to the block X subject to encoding, the reference index refIdxL0X in the direction 0 is 0, the motion vector mvL0X in the direction 0 is (−8, 8), the reference index refIdxL1X in the direction 1 is 0, and the motion vector mvL1B in the direction 1 is (8, −8).

With respect to the neighboring block A, the reference index refIdxL0A in the direction 0 is −1, the motion vector mvL0A in the direction 0 is (0, 0), the reference index refIdxL1A in the direction 1 is 0, and the motion vector mvL1A in the direction 1 is (0, 0).

With respect to the block B, the reference index refIdxL0B in the direction 0 is 0, the motion vector mvL0B in the direction 0 is (−8, 8), the reference index refIdxL1B in the direction 1 is 0, and the motion vector mvL1B in the direction 1 is (8, −8).

With respect to the block C, the reference index refIdxL0C in the direction 0 is 0, the motion vector mvL0C in the direction 0 is (0, 0), the reference index refIdxL1C in the direction 1 is −1, and the motion vector mvL1C in the direction 1 is (0, 0).

The reason why refIdxL0A is −1, mvL0A is (0, 0), refIdxL1C is −1a, and mvL1C is (0, 0) is that the block A and the block C are for unidirectional prediction.

According to the conventional method for predicting a motion vector described above, with respect to the direction 0 for the block X subject to encoding, there exist two indices as a reference index having a value identical to the reference index refIdxL0X of the block X subject to encoding, namely the reference index refIdxL0B of the block B and the reference index refIdxL0C of the block C. Therefore, the motion vector predictor mvpL0X is derived as (0, 0) by calculating the median values of respective elements of the motion vectors mvL0A, mvL0B, and mvL0C of the neighboring blocks A, B, and C in the direction 0 as shown in the equation 2.

$$mvpL0X=(\text{Median}[0,-8,0],\text{Median}[0,8,0])=(0,0) \quad [\text{equation 2}]$$

In this process, the motion vector difference dmvL0X is derived as (−8, 8) by calculating the difference between the motion vector mvL0X of the block X subject to encoding and the motion vector predictor mvpL0X as shown in the equation 3.

$$dmvL0X=mvL0X-mvpL0X=(-8-0,8-0)=(-8,8) \quad [\text{equation 3}]$$

In a similar manner, with respect to the direction 1 for the block X subject to encoding, there exist two indices as a reference index having a value identical to the reference index refIdxL1X of the block X subject to encoding, namely the reference index refIdxL1A of the block A and the reference index refIdxL1B of the block B. Therefore, the motion vector predictor mvpL1X is derived as (0, 0) by calculating the median values of respective elements of the motion vectors mvL1A, mvL1B, mvL1C of the neighboring blocks A, B, and C in the direction 1 as shown in the equation 4.

$$mvpL1X=(\text{Median}[0,8,0],\text{Median}[0,-8,0])=(0,0) \quad [\text{equation 4}]$$

In this process, the motion vector difference dmvL1X is derived as (8, −8) by calculating the difference between the motion vector mvL1X of the block X subject to encoding and the motion vector predictor mvpL1X as shown in equation 5.

$$dmvL1X=mvL1X-mvpL1X=(8-0,-8-0)=(8,-8) \quad [\text{equation 5}]$$

As described above, the block X subject to encoding, to which bidirectional prediction has applied, has originally a high correlation with the neighboring block B that is a sole neighboring block to which bidirectional prediction has applied in a similar manner. However, there exists another neighboring block that has an identical reference index other than the neighboring block B in case the identity of reference index is determined independently for each prediction direction. Therefore, according to the conventional method for predicting a motion vector, a motion vector predictor is inevitably derived based on an intermediate value of all of the neighboring blocks for each prediction direction, and an accurate motion vector predictor can not be derived. Thus encoding with reduced redundancy of a motion vector of a block subject to encoding can not be performed.

In the light of the presupposed technology and the conventional technology described above, an explanation will be given below on a first embodiment of the present invention.

Figure 4:
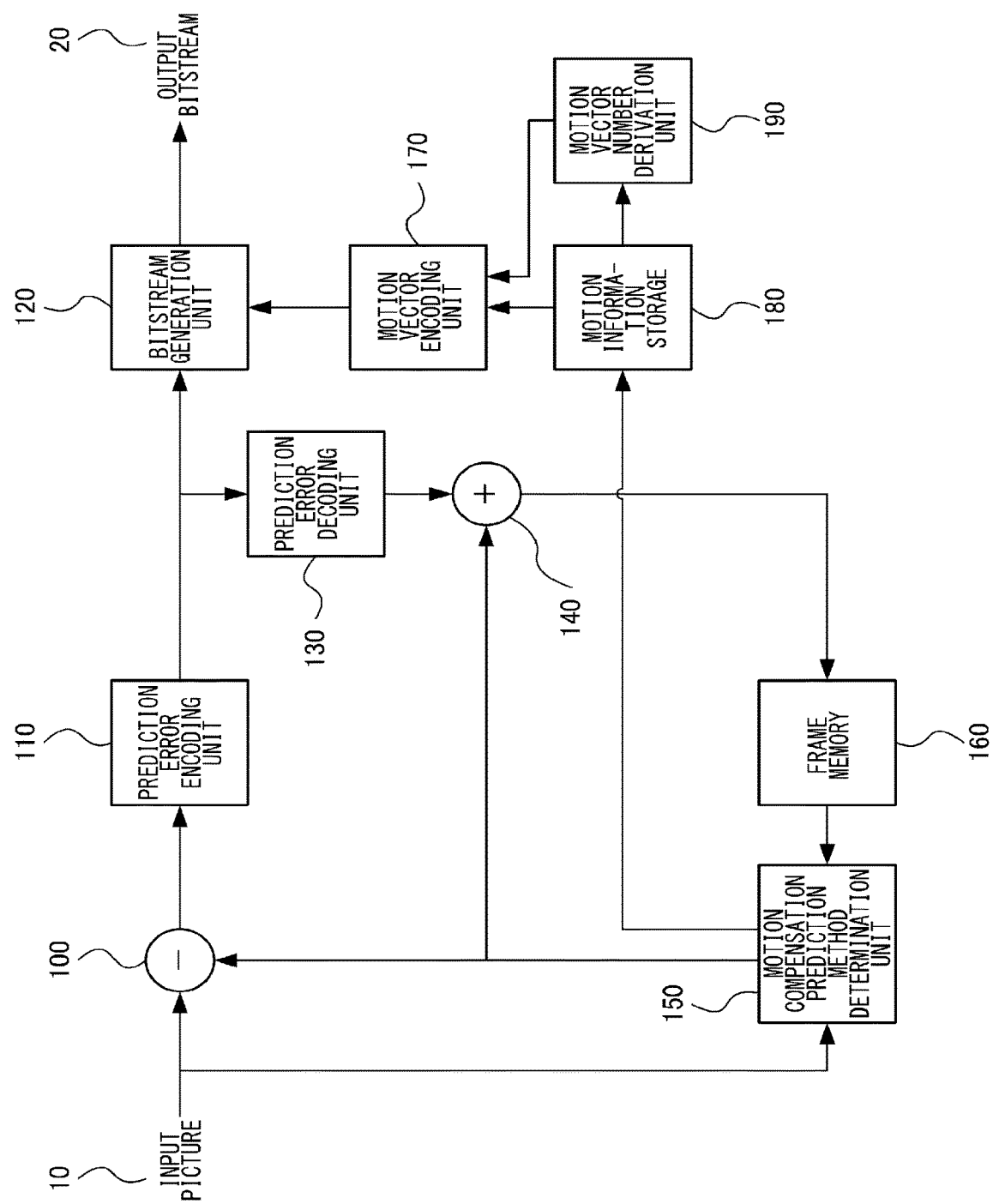
FIG. 4 shows a configuration of a moving picture encoding device according to a first embodiment.

FIG. 4 shows a configuration of a moving picture encoding device using a method for predicting a motion vector according to the first embodiment. The moving picture encoding device includes a subtraction unit 100, a prediction error encoding unit 110, a bitstream generation unit 120, a prediction error decoding unit 130, an addition unit 140, a motion compensation prediction method determination unit 150, a frame memory 160, a motion vector encoding unit 170, a motion information storage 180, and a motion vector number derivation unit 190.

First, an explanation will be given on the flow of moving picture encoding process performed by the moving picture encoding device.

Encoding is performed in units of macroblocks. An input picture 10 is divided into units of macroblocks, and provided for the subtraction unit 100 and the motion compensation prediction method determination unit 150.

From a macroblock subject to encoding and from reference pictures provided from the frame memory 160, the motion compensation prediction method determination unit 150 detects a motion vector for each reference picture by using a technique, such as a block matching technique or the like. The motion compensation prediction method determination unit 150 determines a most appropriate motion compensation prediction method from the detected motion vectors by using rate distortion optimization or the like, and generates a prediction picture.

The motion compensation prediction method determination unit 150 provides the subtraction unit 100 and the addition unit 140 with the prediction picture generated by using the determined motion compensation prediction method. Further, the motion compensation prediction method determination unit 150 sends a reference index and a motion vector corresponding to the determined motion compensation prediction method to the motion information storage 180.

In this specification, the determination of a motion compensation prediction method refers to the determination of: a method for dividing a macroblock into one or more prediction blocks; a method for predicting with respect to the divided prediction block (unidirectional prediction/bidirectional prediction); and a reference picture (reference index) for each prediction direction.

The subtraction unit 100 calculates a prediction error from a difference between the macroblock subject to encoding and the prediction picture provided from the motion compensation prediction method determination unit 150, and provides the prediction error to the prediction error encoding unit 110.

The prediction error encoding unit 110 performs a process such as an orthogonal transformation, quantization, or the like on the prediction error provided from the subtraction unit 100 so as to transform the prediction error to prediction error encoding data, and provides the prediction error encoding data to the bitstream generation unit 120 and to the prediction error decoding unit 130.

The prediction error decoding unit 130 performs a process such as inverse quantization, an inverse orthogonal transformation, or the like on the prediction error encoding data provided from the prediction error encoding unit 110 so as to transform the prediction error encoding data to a prediction error, and provides the prediction error to the addition unit 140.

The addition unit 140 calculates a decoded picture by adding the prediction error provided from the prediction error decoding unit 130 and the prediction picture provided from the motion compensation prediction method determination unit 150, and provides the decoded picture to the frame memory 160.

The frame memory 160 stores as a reference picture the decoded picture provided from the addition unit 140 and provides the reference picture to the motion compensation prediction method determination unit 150.

The motion information storage 180 stores the motion vector and the reference index provided from the motion compensation prediction method determination unit 150 and provides the motion vector and the reference index to the motion vector encoding unit 170. The motion information storage 180 has stored motion vectors and reference indices with respect to all macroblocks of the input picture, and provides the motion vector encoding unit 170 with the motion vector and the reference index of a macroblock neighboring the macroblock subject to encoding.

According to the first embodiment, the motion information storage 180 has stored the motion vectors and the reference indices with respect to all macroblocks of the input picture. However, the purpose of the motion information storage 180 is to provide the motion vector encoding unit 170 with the motion vector and the reference index of a macroblock neighboring the macroblock subject to encoding. Therefore, as far as the purpose is fulfilled, the motion information storage 180 does not have to store motion vectors and the reference indices with respect to all macroblocks of the input picture, but is merely required to store necessary motion vectors and reference indices.

The motion vector encoding unit 170 calculates a motion vector predictor from: the motion vector and the reference index of the macroblock subject to encoding and the motion vector and the reference index of the neighboring macroblock provided from the motion information storage 180; and a motion vector number of the macroblock subject to encoding and the neighboring macroblock provided from the motion vector number derivation unit 190. The motion vector encoding unit 170 calculates a motion vector difference from the motion vector of the macroblock subject to encoding and from the motion vector predictor, transforms the motion vector difference to motion vector difference encoding data, and provides the bitstream generation unit 120 therewith. The detailed description on the method for predicting a motion vector will be given later.

The bitstream generation unit 120 transforms the prediction error encoding data provided from the prediction error encoding unit 110 and the motion vector difference encoding data provided from the motion vector encoding unit 170 to an output bitstream together with other control information or the like, and outputs the output bitstream.

The motion vector number derivation unit 190 derives a motion vector number for each macroblock from the motion information storage 180, and provides the motion vector encoding unit 170 with the motion vector numbers of the macroblock subject to encoding and of the neighboring macroblock.

With respect to the derivation of the motion vector number, it is also possible to derive the motion vector number, for example, from information indicating a motion compensation prediction method determined by the motion compensation prediction method determination unit 150 as well as to derive the motion vector number for each macroblock from the motion information storage 180.

Figure 5:
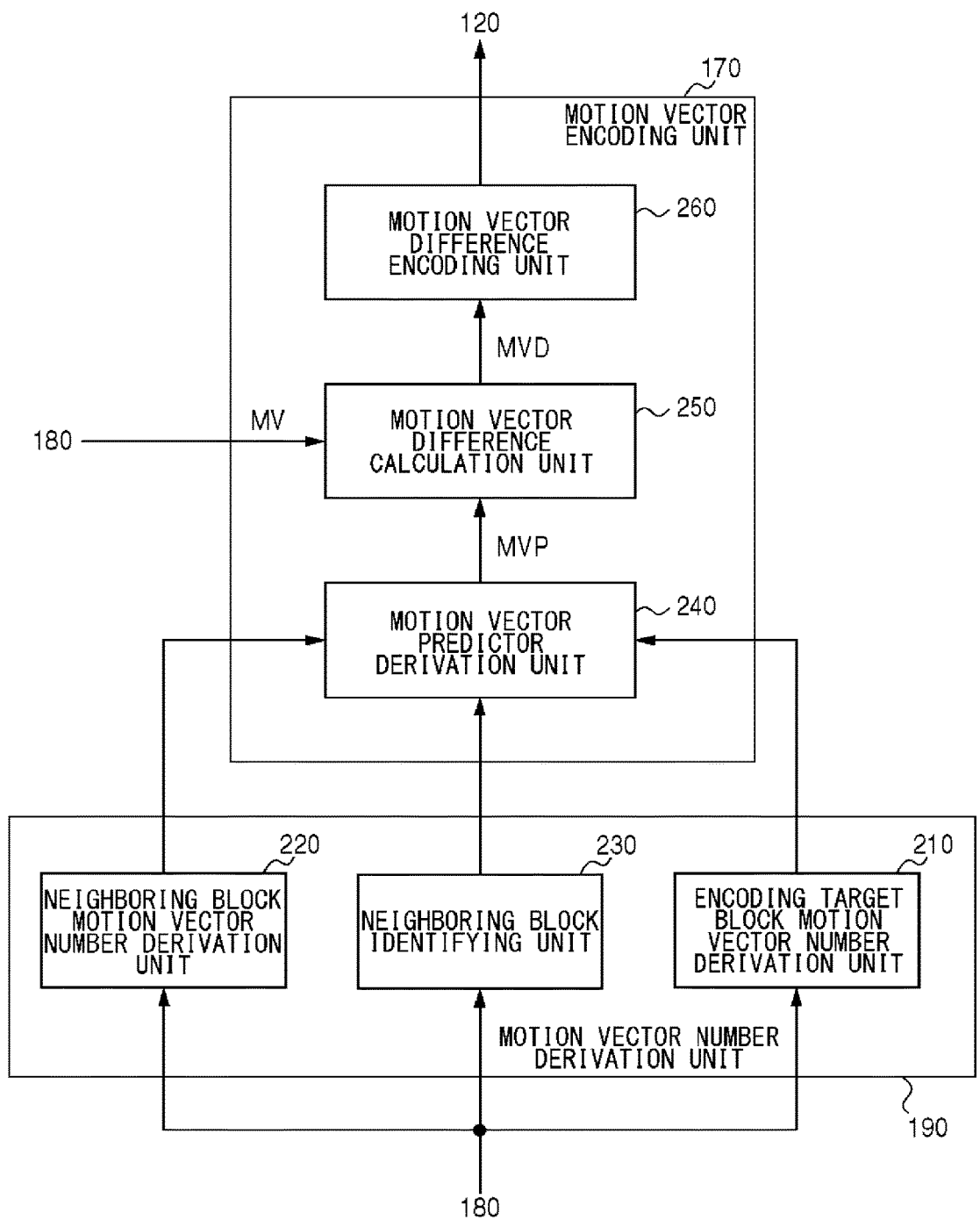
FIG. 5 shows a detailed configuration of a motion vector number derivation unit and a motion vector encoding unit in FIG. 4.
Figure 6:
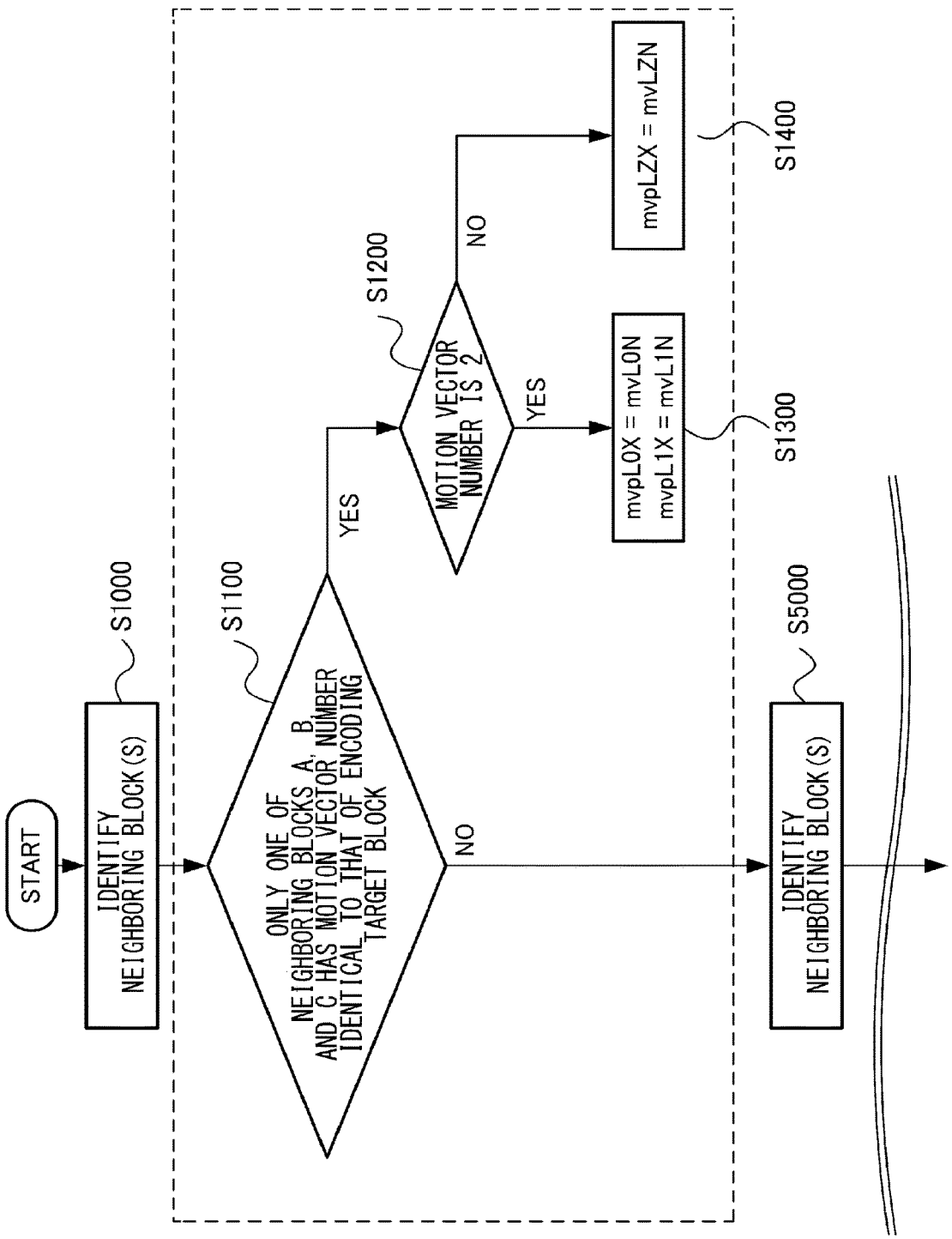
FIG. 6 shows a flowchart for illustrating a method for deriving a motion vector predictor according to the first embodiment in detail.

FIG. 5 shows a detailed configuration of the motion vector number derivation unit 190 and the motion vector encoding unit 170 in FIG. 4.

The motion vector number derivation unit 190 includes an encoding target block motion vector number derivation unit 210, a neighboring block motion vector number derivation unit 220, and a neighboring block identifying unit 230.

The motion vector encoding unit 170 includes a motion vector predictor derivation unit 240, a motion vector difference calculation unit 250, and a motion vector difference encoding unit 260.

The encoding target block motion vector number derivation unit 210 derives the number of motion vectors of the block subject to encoding from the motion information storage 180. The neighboring block identifying unit 230 refers to the motion information storage 180 and identifies a plurality of encoded neighboring blocks that are located in adjacent areas of the block subject to encoding. The neighboring block motion vector number derivation unit 220 derives the number of motion vectors of the identified neighboring blocks from the motion information storage 180.

The motion vector predictor derivation unit 240 receives from the neighboring block identifying unit 230 information on the reference index and the motion vector of the plurality of neighboring blocks, receives from the encoding target block motion vector number derivation unit 210 the motion vector number of the block subject to encoding, and receives from the neighboring block motion vector number derivation unit 220 the motion vector number of the neighboring blocks.

In case that only one neighboring block exists among the plurality of neighboring blocks that has a motion vector number identical to the motion vector number of the block subject to encoding, the motion vector predictor derivation unit 240 identifies the neighboring block as a prediction block candidate and provides the motion vector difference calculation unit 250 with the motion vector of the prediction block candidate as a motion vector predictor MVP.

The motion vector difference calculation unit 250 calculates a motion vector difference MVD on the basis of the difference between the motion vector MV of the block subject to encoding that is read from the motion information storage 180 and the motion vector predictor MVP received from the motion vector predictor derivation unit 240, and provides the motion vector difference MVD to the motion vector difference encoding unit 260.

The motion vector difference encoding unit encodes the motion vector difference MVD and provides the bitstream generation unit 120 with the encoded motion vector difference MVD.

Next, an explanation will be given on a method for deriving a motion vector predictor according to the first embodiment while referring to FIG. 1A, FIG. 1B, FIG. 2, and FIG. 6. The derivation of the motion vector predictor is processed in units of prediction blocks in the macroblock subject to encoding. In the method for deriving a motion vector predictor according to the first embodiment, a first motion vector predictor derivation process is performed as a preceding step, and a second motion vector predictor derivation process is performed as a following step, accordingly. The second motion vector predictor derivation process is applied in a similar manner as that of the conventional motion vector predictor derivation process explained by FIGS. 1A and 1B.

An explanation will be given on the first motion vector predictor derivation process in the preceding step.

First, the neighboring block identifying unit 230 determines the block A, the block B, and the block C that are blocks neighboring the block X subject to encoding as shown in FIG. 1A (step S1000).

Next, the neighboring block motion vector number derivation unit 220 derives the motion vector number of the block A, the motion vector number of the block B, and the motion vector number of the block C. The motion vector predictor derivation unit 240 examines whether only one neighboring block N that has a motion vector number identical to a motion vector number of the block X subject to encoding exists among the neighboring blocks A, B, and C (step S1100).

In case that only one neighboring block N that has the motion vector number identical to that of the block X subject to encoding exists (YES in step S1100), the motion vector predictor derivation unit 240 identifies the neighboring block as a prediction block candidate, and examines whether the motion vector number of the block X subject to encoding is 2 (step S1200).

In case that only one neighboring block N has the motion vector number identical to that of the block X subject to encoding, and that the motion vector number of the block X subject to encoding is 2 (YES in step S1200), the motion vector of the neighboring block N is set as the motion vector predictor of the block X subject to encoding in the both directions (the previous direction L0 and the subsequent direction L1) as shown in equation 6 (step S1300).

$$mvpL0X = mvL0N$$
$$mvpL1X = mvL1N \qquad \text{[equation 6]}$$

In case that only one neighboring block N has the motion vector number identical to that of the block X subject to encoding, and that the motion vector number of the block X subject to encoding is not 2 (NO in step S1200), the motion vector of the neighboring block N in a single prediction direction (the previous direction L0 or the subsequent direction L1) is set as the motion vector predictor of the block X subject to encoding as shown in equation 7 (step S1400). The single prediction direction Z is a direction where a motion vector exists.

$$mvpLZX = mvLZN \qquad \text{[equation 7]}$$

In case that no neighboring block has the motion vector number identical to that of the block X subject to encoding, or more than one neighboring blocks have the motion vector number identical to that of the block X subject to encoding (NO in S1000), the conventional process of step S000 and the following steps is executed as the second motion vector predictor derivation process.

According to the explanation given above, the block A, the block B, and the block C, which are neighboring blocks, are located at the positions shown in FIG. 1A. However, the positions of the neighboring blocks are not limited to the positions shown in FIG. 1A, but any position can be adopted as far as a block at the position has been encoded. Further, the number of the neighboring blocks is not necessarily three but any number more than or equal to two can be adopted. Further, a neighboring block is not limited to a block that is spatially adjacent to the block subject to encoding in the same picture, but may be a block at the same position as or adjacent to a block subject to encoding in a reference picture that is encoded right before, wherein the block subject to encoding in the reference picture is temporally adjacent to the block subject to encoding in the present picture.

Although step S000 and the following steps are executed as the second motion vector predictor derivation process according to the first embodiment, the second motion vector predictor derivation process is not limited to the process of step S000 and the following steps. For example, in case that two or more neighboring blocks have a motion vector number identical to that of the block X subject to encoding, a motion vector of one of the plurality of neighboring blocks having a motion vector number identical to that of the block X subject to encoding may be set as the motion vector predictor. Alternatively, a weighted mean average of the motion vectors of the plurality of neighboring blocks having the motion vector number identical to that of the block X subject to encoding may be calculated and set as the motion vector predictor. In a similar manner, also in case that no neighboring block has the motion vector number identical to that of the block X subject to encoding, a motion vector of one of the plurality of neighboring blocks may be set as the motion vector predictor, or a weighted mean average of the motion vectors of the plurality of neighboring blocks may be calculated and set as the motion vector predictor.

Next, an explanation will be given on advantages of the method for deriving a motion vector predictor according to the first embodiment.

Figure 3:
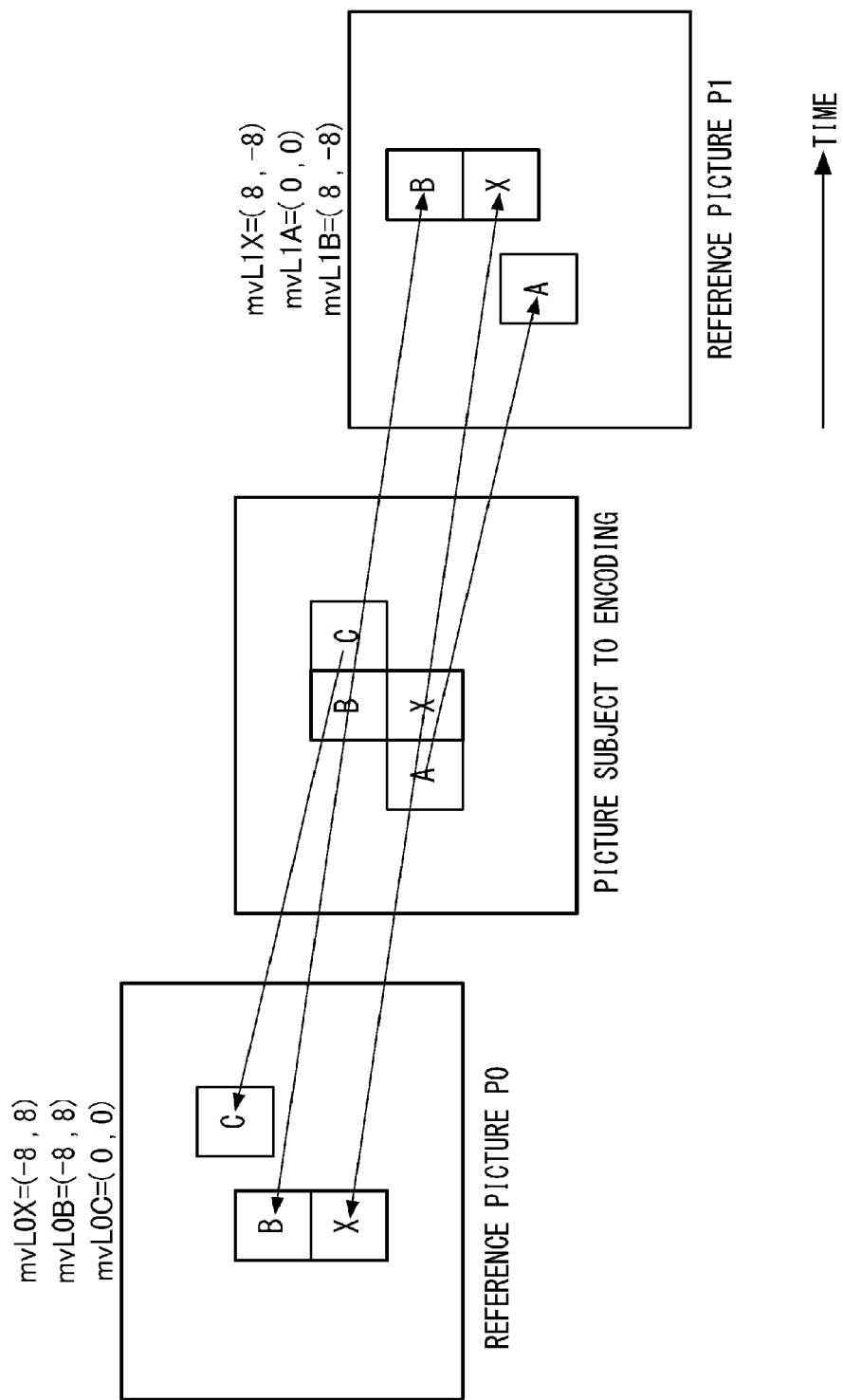
FIG. 3 shows a specific example of the conventional method for predicting a motion vector.

It is assumed that the method for deriving a motion vector predictor according to the first embodiment is applied to the specific example explained by FIG. 3. The only one neighboring block that has the motion vector number 2, which is identical to that of the block X subject to encoding, is the block B. Therefore, the motion vector predictors mvpL0X and mvpL1X of the block X subject to encoding are derived from the equation 8 as (−8, 8) and (8, −8), respectively.

$$mvpL0X=mvL0B=(-8,8)$$

$$mvpL1X=mvL1B=(8,-8) \quad \text{[equation 8]}$$

In this process, the motion vector differences dmvL0X and dmvL0X are derived from the equation 9 as (0, 0) and (0, 0), respectively.

$$dmvpL0X=mvL0X-mvpL0X=(-8,8)-(-8,8)=(0,0)$$

$$dmvpL1X=mvL0X-mvpL0X=(8,-8)-(8,-8)=(0,0) \quad \text{[equation 9]}$$

As described above, according to the method for deriving a motion vector predictor of the first embodiment, the motion vector of a neighboring block that has a motion vector number identical to the motion vector number of a block subject to encoding is set as the motion vector predictor. This allows derivation of the motion vector predictor according to an original motion and encoding with reduced redundancy of the motion vector of the block subject to encoding, even in case that a motion of an object having a time correlation different from that of a motion of the block subject to encoding exists in a neighboring block.

Figure 7:
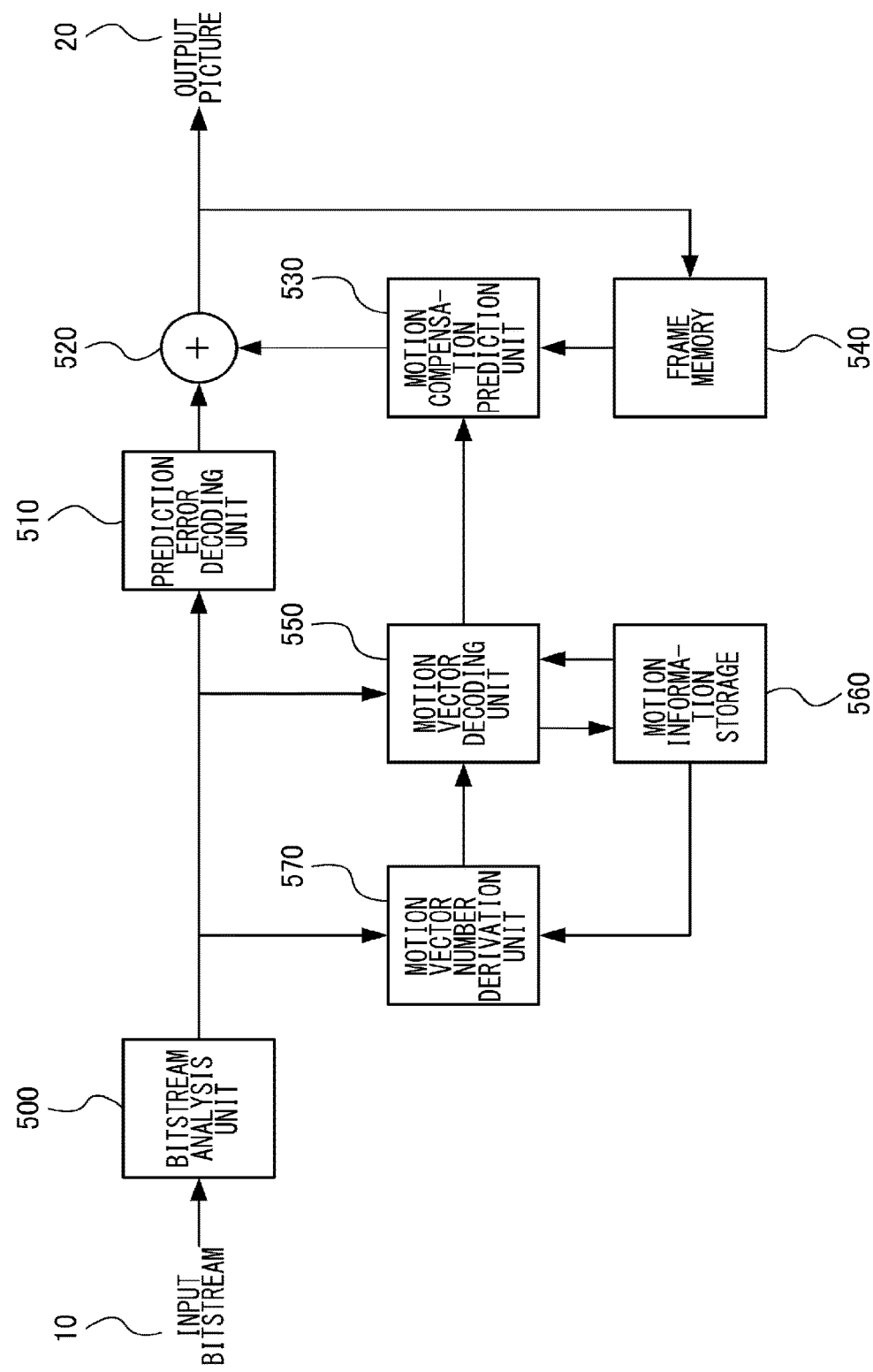
FIG. 7 shows a configuration of a moving picture decoding device according to a first embodiment.

FIG. 7 shows a configuration of a moving picture decoding device using a method for predicting a motion vector according to the first embodiment. The moving picture decoding device includes a bitstream analysis unit 500, a prediction error decoding unit 510, an addition unit 520, a motion compensation prediction unit 530, a frame memory 540, a motion vector decoding unit 550, a motion information storage 560, and a motion vector number derivation unit 570.

First, an explanation will be given on the flow of moving picture decoding process performed by the moving picture decoding device.

Decoding is performed in units of macroblocks. An input bitstream 10 is provided to the bitstream analysis unit 500.

The bitstream analysis unit 500 decodes and derives prediction error encoding data, a motion vector difference, a reference index, and a macroblock type from the input bitstream 10. In units of prediction blocks, the bitstream analysis unit 500 provides the prediction error encoding data to the prediction error decoding unit 510, the motion vector difference and the reference index to the motion vector decoding unit 550, and the macroblock type to the motion vector number derivation unit 570.

For example in case that the macroblock consists of four prediction blocks, the following process is to be repeated four times in the macroblock.

The prediction error decoding unit 510 performs a process such as inverse quantization, an inverse orthogonal transformation, or the like on the prediction error encoding data provided from the bitstream analysis unit 500 so as to transform the prediction error encoding data to a prediction error, and provides the prediction error to the addition unit 520.

The motion vector decoding unit 550 calculates a motion vector predictor by using: the motion vector difference and the reference index of the macroblock subject to decoding provided from the bitstream analysis unit 500; the motion vector number of the macroblock subject to decoding and a neighboring macroblock provided from the motion vector number derivation unit 570; and the motion vector and the reference index of the neighboring macroblock provided from the motion information storage 560. The motion vector decoding unit 550 decodes the motion vector from the motion vector difference and the motion vector predictor of the macroblock subject to decoding, and provides the decoded motion vector and the reference index to the motion compensation prediction unit 530 and to the motion information storage 560. The detailed description on the method for decoding a motion vector will be given later.

The motion information storage 560 stores the motion vector and the reference index provided from the motion vector decoding unit 550 and provides the motion vector decoding unit 550 with the stored motion vector and the stored reference index as necessary.

The motion vector number derivation unit 570 derives a motion vector number for each macroblock from the macroblock type provided from the bitstream analysis unit 500 and provides the motion vector decoding unit 550 with the motion vector number of the macroblock subject to decoding and the neighboring macroblock.

With respect to the derivation of the motion vector number, it is also possible to determine based on the number of motion vector differences, the number of reference indices, or the like as well as to derive the motion vector number from the macroblock type.

The motion compensation prediction unit 530 generates a predicted value by using: the motion vector and the reference index provided from the motion vector decoding unit 550; and the reference picture provided from the frame memory 540, and provides the addition unit 520 with the predicted value.

The addition unit 520 adds the prediction error provided from the prediction error decoding unit 510 and the prediction error provide from the motion compensation prediction unit 530 so as to generates a decoded value. The addition unit 520 provides the frame memory 540 with the decoded value and outputs the decoded value as an picture output 60.

The frame memory 540 stores the decoded picture provided from the addition unit 520, and provides the motion compensation prediction unit 530 with the stored decoded picture as a reference picture as necessary.

Figure 8:
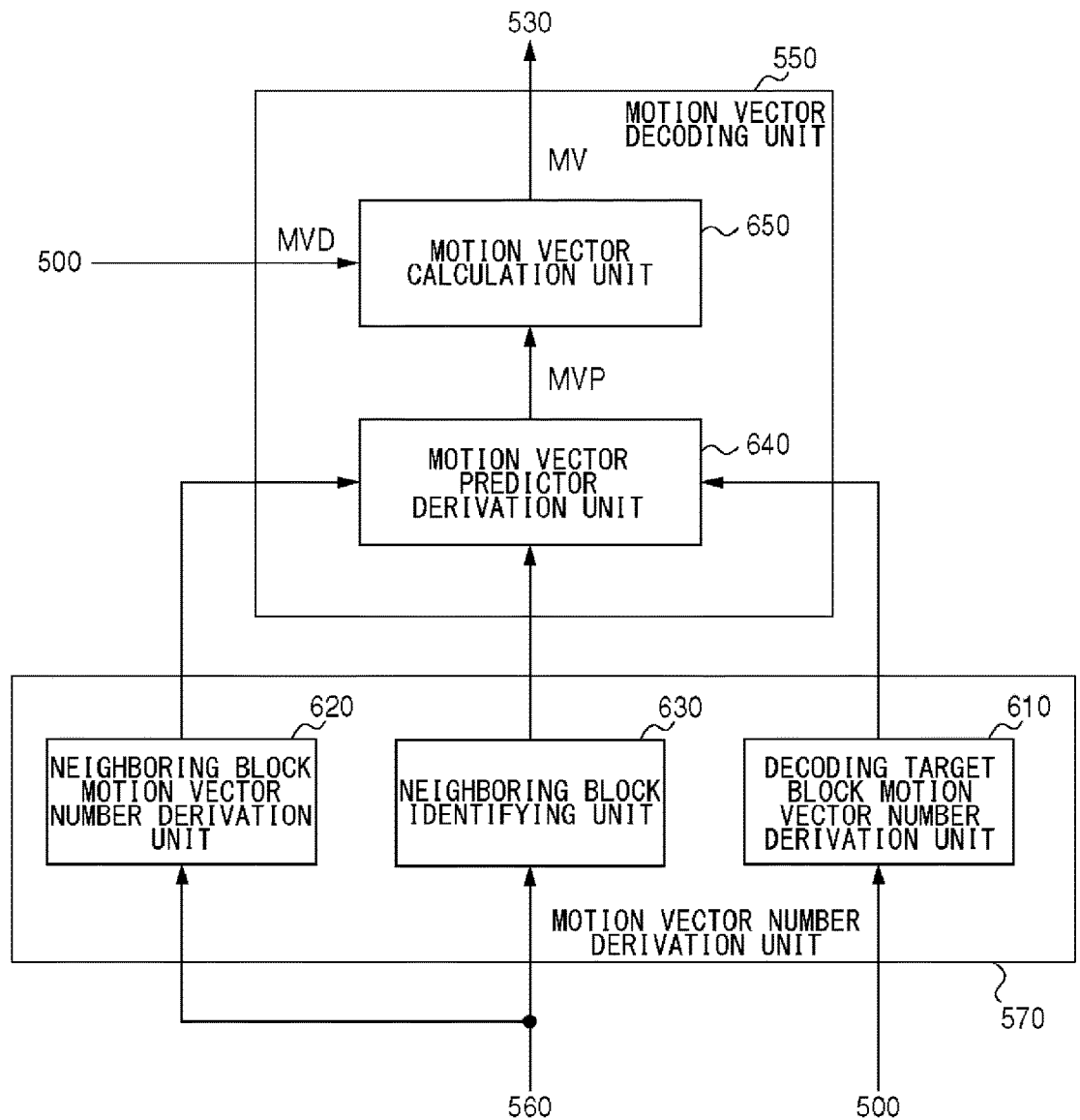
FIG. 8 shows a detailed configuration of a motion vector number derivation unit and a motion vector decoding unit in FIG. 7.

FIG. 8 shows a detailed configuration of the motion vector number derivation unit 570 and the motion vector decoding unit 550 in FIG. 7.

The motion vector number derivation unit 570 includes a decoding target block motion vector number derivation unit 610, a neighboring block motion vector number derivation unit 620, and a neighboring block identifying unit 630.

The motion vector decoding unit 550 includes a motion vector predictor derivation unit 640 and a motion vector calculation unit 650.

The decoding target block motion vector number derivation unit 610 derives from the bitstream analysis unit 500 the number of motion vectors of a block subject to decoding. The neighboring block identifying unit 630 refers to the motion information storage 560 and identifies a plurality of decoded neighboring blocks that are located in adjacent areas of the block subject to decoding. The neighboring block motion vector number derivation unit 620 derives the number of motion vectors of each of the identified neighboring blocks from the motion information storage 560.

The motion vector predictor derivation unit 640 receives from the neighboring block identifying unit 630 information on the reference index and the motion vector of the plurality of neighboring blocks, receives from the decoding target block motion vector number derivation unit 610 the motion vector number of the block subject to decoding, and receives from the neighboring block motion vector number derivation unit 620 the motion vector number of the neighboring blocks.

In case that only one neighboring block exists among the plurality of neighboring blocks that has a motion vector number identical to the motion vector number of the block subject to decoding, the motion vector predictor derivation unit 640 identifies the neighboring block as a prediction block candidate and provides the motion vector calculation unit 650 with the motion vector of the prediction block candidate as a motion vector predictor MVP.

The motion vector calculation unit 650 calculates a motion vector MV by adding the motion vector difference MVD of the block subject to decoding received from the bitstream analysis unit 500 and the motion vector predictor MVP received from the motion vector predictor derivation unit 640, and provides the motion vector MV to the motion compensation prediction unit 530.

The method for deriving a motion vector predictor by the moving picture decoding device according to the first embodiment is same as the method for deriving a motion vector predictor by the moving picture encoding device according to the first embodiment provided that the "block subject to encoding" is replaced with "block subject to decoding." Therefore, the detailed explanation thereof is omitted.

Next, an explanation will be given on a second embodiment of the present invention.

Figure 9:
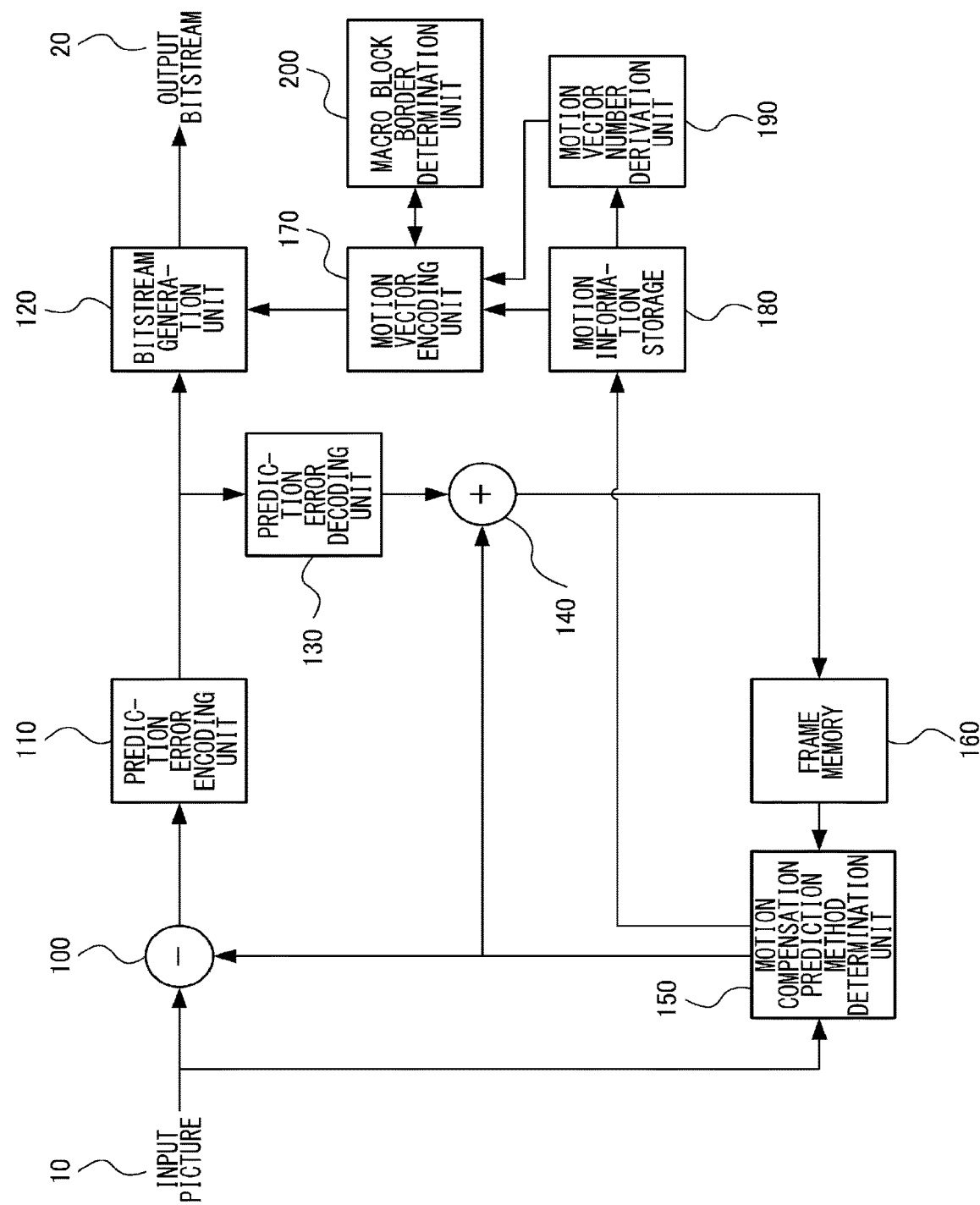
FIG. 9 shows a configuration of a moving picture encoding device according to a second embodiment.

FIG. 9 shows a configuration of a moving picture encoding device using a method for predicting a motion vector according to the second embodiment. The moving picture encoding device includes a subtraction unit 100, a prediction error encoding unit 110, a bitstream generation unit 120, a prediction error decoding unit 130, an addition unit 140, a motion compensation prediction method determination unit 150, a frame memory 160, a motion vector encoding unit 170, a motion information storage 180, a motion vector number derivation unit 190, and a macroblock border determination unit 200.

The subtraction unit 100, the prediction error encoding unit 110, the bitstream generation unit 120, the prediction error decoding unit 130, the addition unit 140, the motion compensation prediction method determination unit 150, the frame memory 160, the motion information storage 180, and the motion vector number derivation unit 190 according to the second embodiment are same as the elements in the first embodiment with the same numerical references. An explanation will be given on the motion vector encoding unit 170 and the macroblock border determination unit 200 that are different from the constituting elements of the first embodiment while referring to FIG. 9 and FIG. 10.

The macroblock border determination unit 200 determines whether or not a block subject to encoding has contact with a macroblock border. If the block subject to encoding has contact with the macroblock border, the macroblock border determination unit 200 sets a macroblock border flag to 1, and if the block subject to encoding does not have contact with the macroblock border, the macroblock border determination unit 200 sets a macroblock border flag to 0 and provides the macroblock border flag to the motion vector encoding unit 170.

Whether or not to have contact with the macroblock border can be determined, for example, by using a prediction block number. An explanation on the prediction block number will be given later.

The motion vector encoding unit 170 calculates a motion vector predictor on the basis of: the motion vector and the reference index of the macroblock subject to encoding and the motion vector and the reference index of the neighboring macroblock provided from the motion information storage 180; the motion vector number provided from the motion vector number derivation unit 190; and the macroblock border flag provided from the macroblock border determination unit 200. The motion vector encoding unit 170 calculates a motion vector difference from the motion vector of the macroblock subject to encoding and of the motion vector predictor, transforms the motion vector difference to motion vector difference encoding data, and provides the bitstream generation unit 120 therewith.

Figure 10:
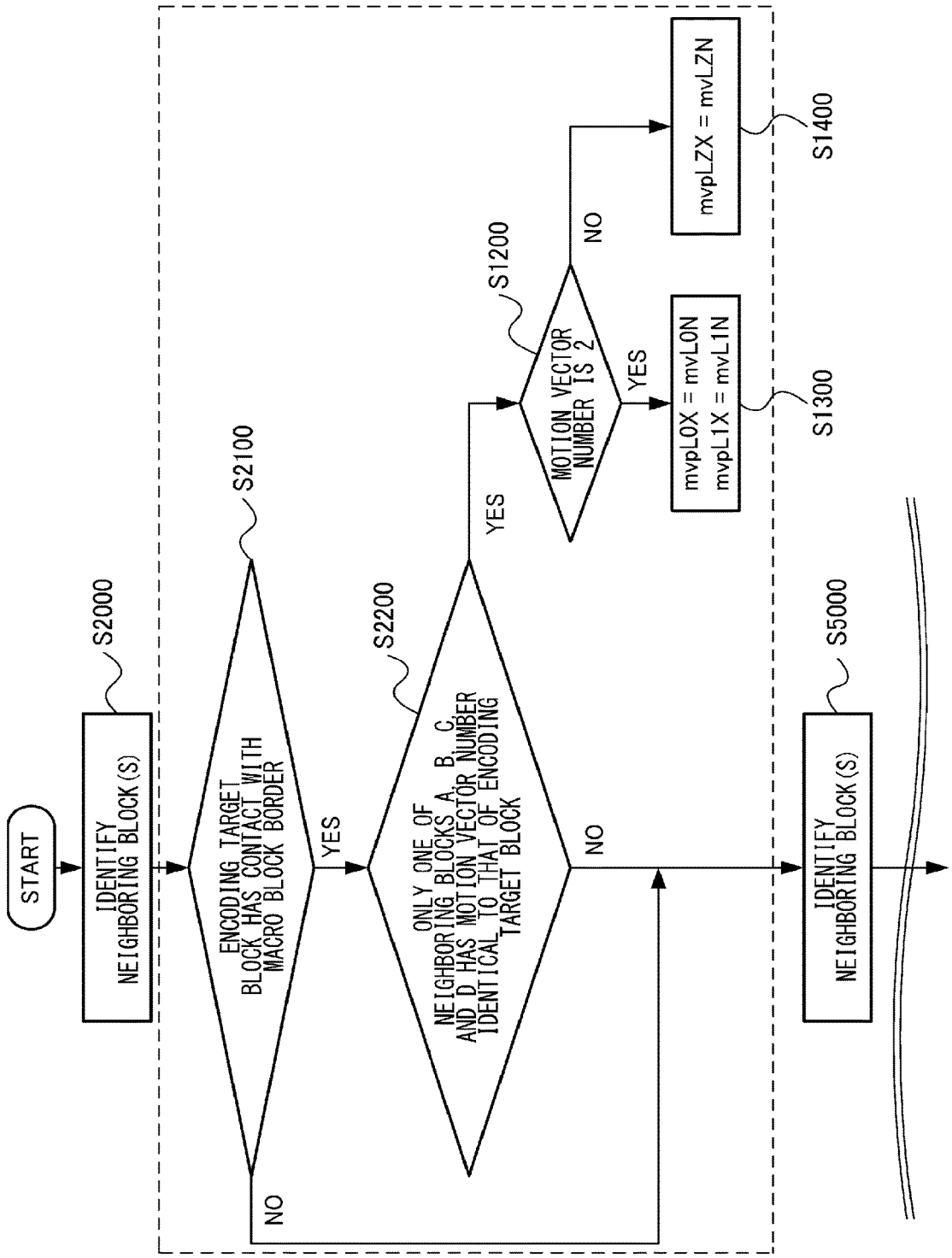
FIG. 10 shows a flowchart for illustrating a method for deriving a motion vector predictor according to the second embodiment in detail.

A detailed explanation will be given on a method for predicting a motion vector predictor according to the second embodiment while referring to FIG. 1A, FIG. 1B, and FIG. 10.

Figure 1B:
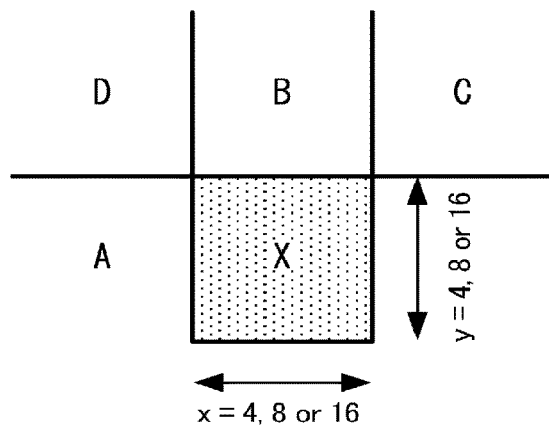

First, the neighboring block identifying unit 230 determines the block A, the block B, the block C, and the block D that are blocks neighboring the block X subject to encoding as shown in FIG. 1B (step S2000).

Next, the macroblock border determination unit 200 examines the value of the macroblock border flag (step S2100).

If the macroblock border flag is 1 (YES in step S2100), the neighboring block motion vector number derivation unit 220 derives the motion vector number of the block A, block B, block C, and the block D. The motion vector predictor derivation unit 240 examines whether only one neighboring block N that has the motion vector number identical to the motion vector number of the block X subject to encoding exists among the neighboring blocks A, B, C, and D (step S2200). After the step 2200, the process of step 1200 and the following steps of the first embodiment is executed.

If the macroblock border flag is 0 (NO in step S2100), the process of step S000 and the following steps is executed as the second motion vector predictor derivation process as explained in the first embodiment.

An explanation will be given on advantages of the method for predicting a motion vector predictor according to the second embodiment by using FIGS. 11A-11E.

Figure 11:
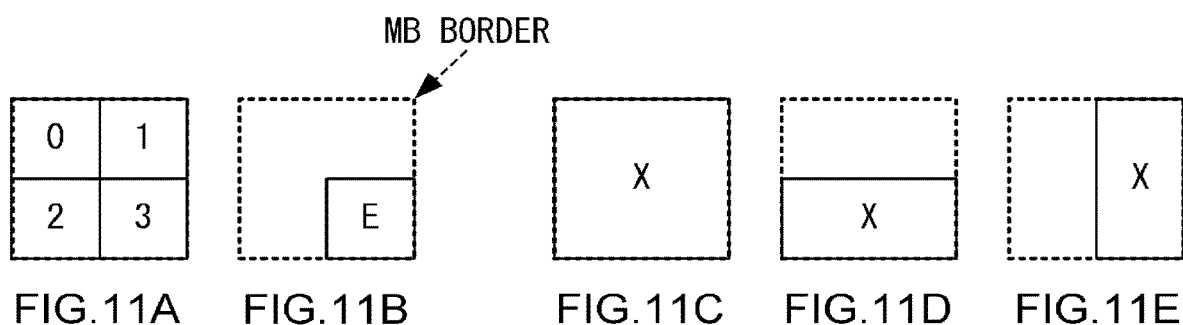
FIGS. 11A-11E illustrate a relation between a macroblock border and a prediction block.

First, an explanation will be given on the prediction block number. FIG. 11A shows a prediction block number in case that a macroblock is divided into four prediction blocks of eight by eight.

As shown in FIG. 11B, there is a block E, which does not have contact with the macroblock border and of which the prediction block number is 3. In case that the block E includes an object identical to that of other block(s) in the macroblock and indicates same motion, the block E is likely to be encoded as one block X as shown in FIG. 11C, FIG. 11D, or FIG. 11E with a high probability. Therefore, in case that the block E exists as an independent prediction block, the likelihood that the block E and other block(s) in the macroblock include a same object and indicates same motion is low. Therefore, in such a case, it is preferable not to execute determination based on motion vector numbers and preferable to proceed to the second motion vector predictor derivation process, which allows a transient motion vector to be eliminated.

For a prediction block that does not have contact with the macroblock border, such as the block E, a neighboring block exists in the same macroblock. Therefore, the condition that the prediction block has not contact with a macroblock border can also be expressed as "a neighboring block is in the same macroblock" in other words.

According to the method for deriving a motion vector predictor according to the embodiment, in case that the block subject to encoding has contact with a macroblock border, the motion vector number of the block subject to encoding and the motion vector number of the neighboring block are taken into account, and in case that the block subject to encoding does not have contact with the macroblock border, the motion vector number of the block subject to encoding and the motion vector number of the neighboring block are not taken into account. This allows the decrease of false detections and allows the derivation of a motion vector predictor according to the original motion.

Figure 12:
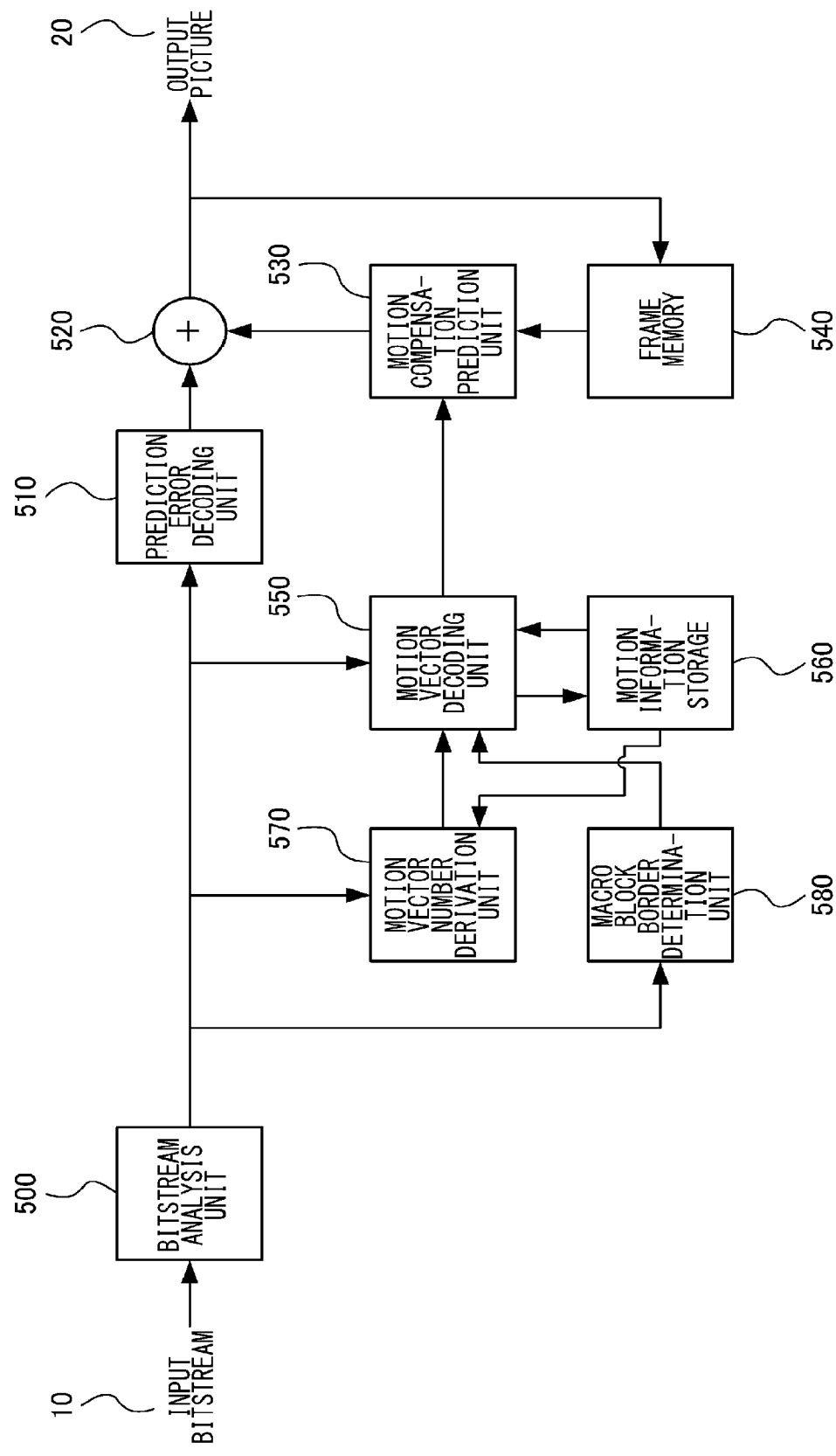
FIG. 12 shows a configuration of a moving picture decoding device according to the second embodiment.

FIG. 12 shows a configuration of a moving picture decoding device using a method for predicting a motion vector according to the second embodiment. The moving picture decoding device includes a bitstream analysis unit 500, a prediction error decoding unit 510, an addition unit 520, a motion compensation prediction unit 530, a frame memory 540, a motion vector decoding unit 550, a motion information storage 560, a motion vector number derivation unit 570, and a macroblock border determination unit 580.

The prediction error decoding unit 510, the addition unit 520, the motion compensation prediction unit 530, the frame memory 540, the motion information storage 560, and the motion vector number derivation unit 570 according to the second embodiment are as same as the elements in the first embodiment with the same numerical references. An explanation will be given on the bitstream analysis unit 500, the motion vector decoding unit 550, and the macroblock border determination unit 580 that are different from the constituting elements of the first embodiment.

The bitstream analysis unit 500 decodes and derives prediction error encoding data, a motion vector difference, a reference index, and a macroblock type from the input bitstream 10. In units of prediction blocks, the bitstream analysis unit 500 provides the prediction error encoding data to the prediction error decoding unit 510, the motion vector difference and the reference index to the motion vector decoding unit 550, the macroblock type to the motion vector number derivation unit 570, and the prediction block number to the macroblock border determination unit 580.

The macroblock border determination unit 580 determines based on the prediction block number provided from the bitstream analysis unit 500 whether or not a block subject to decoding has contact with a macroblock border. If the block subject to decoding has contact with the macroblock border, the macroblock border determination unit 580 sets a macroblock border flag to 1, and if the block subject to decoding does not have contact with the macroblock border, the macroblock border determination unit 580 sets a macroblock border flag to 0 and provides the macroblock border flag to the motion vector decoding unit 550.

The motion vector decoding unit 550 calculates a motion vector predictor by using: the motion vector difference and the reference index of the macroblock subject to decoding provided from the bitstream analysis unit 500; the motion vector number of the macroblock subject to decoding and a neighboring macroblock provided from the motion vector number derivation unit 570; the macroblock border flag provided from the macroblock border determination unit 580; and the motion vector and the reference index of the neighboring block provided from the motion information storage 560. The motion vector decoding unit 550 decodes the motion vector from the motion vector difference and the motion vector predictor of the macroblock subject to decoding, and provides the decoded motion vector and reference index to the motion compensation prediction unit 530 and to the motion information storage 560.

The method for deriving a motion vector predictor by the moving picture decoding device according to the second embodiment is same as the method for deriving a motion vector predictor by the moving picture encoding device according to the second embodiment provided that the "block subject to encoding" is replaced with "block subject to decoding." Therefore, the detailed explanation thereof is omitted.

Next, before an explanation on a third embodiment is given, an explanation will be given on a problem of the conventional method for predicting a motion vector with another specific example while referring to FIG. 13.

The positions of the neighboring block A, block B, and block C relative to the block X subject to encoding is as shown in the figure. In this example, two previous reference pictures P0 and P1 and one subsequent reference picture P2 are used with respect to the picture subject to encoding. Since a same object exists in the block X subject to encoding and in the block B, bidirectional prediction using a previous reference picture P1 and a subsequent reference picture P2 is used for the block X subject to encoding and for the block B. On the other hand, bidirectional prediction based on the previous reference picture P0 and the subsequent reference picture P2 is used for an object including the block A, and unidirectional prediction based on the previous reference picture P1 is used for an object including the block C.

For the block X subject to encoding, motion compensation prediction where the motion vector is (−8, 8) with respect to the reference picture P1 is performed, and motion compensation prediction where the motion vector is (8, −8) with respect to the reference picture P2 is performed. For the block A, motion compensation prediction where the motion vector is (0, 0) with respect to the reference picture P0 is performed, and motion compensation prediction where the motion vector is (0, 0) with respect to the reference picture P2 is performed. For the block B, motion compensation prediction where the motion vector is (−8, 8) with respect to the reference picture P1 is performed, and motion compensation prediction where the motion vector is (8, −8) with respect to the reference picture P2 is performed. For the block C, motion compensation prediction where the motion vector is (0, 0) with respect to the reference picture P1 is performed.

In this example, '0' in the reference index in the direction 0 indicates the reference picture P1, '1' in the reference index in the direction 0 indicates the reference picture P0, and '0' in the reference index in the direction 1 indicates the reference picture P2.

With respect to the block X subject to encoding, the reference index refIdxL0X in the direction 0 is 0, the motion vector mvL0X in the direction 0 is (−8, 8), the reference index refIdxL1X in the direction 1 is 0, and the motion vector mvL1B in the direction 1 is (8, −8).

With respect to the neighboring block A, the reference index refIdxL0A in the direction 0 is 1, the motion vector mvL0A in the direction 0 is (0, 0), the reference index refIdxL1A in the direction 1 is 0, and mvL1A in the direction 1 is (0, 0).

With respect to the neighboring block B, the reference index refIdxL0B in the direction 0 is 0, the motion vector mvL0B in the direction 0 is (−8, 8), the reference index refIdxL1B in the direction 1 is 0, and the motion vector mvL1B in the direction 1 is (8, −8).

With respect to the neighboring block C, the reference index refIdxL0C in the direction 0 is 0, the motion vector mvL0C in the direction 0 is (0, 0), the reference index refIdxL1C in the direction 1 is −1, and the motion vector mvL1C in the direction 1 is (0, 0).

According to the conventional method for predicting a motion vector, with respect to the direction 0 for the block X subject to encoding, there exist two indices as a reference index having a value identical to the reference index refIdxL0X of the block X subject to encoding, namely the reference index refIdxL0B of the block B and the reference index refIdxL0C of the block C. Therefore, the motion vector predictor mvpL0X is derived as (0, 0) by calculating the median values of respective elements of the motion vectors mvL0A, mvL0B, and mvL0C of the neighboring blocks A, B, and C in the direction 0 as shown in the equation 10.

$$mvpL0X=(\text{Median}[0,-8,0], \text{Median}[0,8,0])=(0,0) \quad \text{[equation 10]}$$

In this process, dmvL0X, which is the motion vector difference, is derived as (−8, 8) by calculating the difference between the motion vector mvL0X of the block X subject to encoding and the motion vector predictor mvpL0X as shown in the equation 11.

$$dmvL0X=mvL0X-mvpL0X=(-8-0,8-0)=(-8,8) \quad \text{[equation 11]}$$

In a similar manner, with respect to the direction 1 for the block X subject to encoding, there exist two indices as a reference index having a value identical to the reference index refIdxL1X of the block X subject to encoding, namely the reference index refIdxL1A of the block A and the reference index refIdxL1B of the block B. Therefore, the motion vector predictor mvpL1X is derived as (0, 0) by calculating the median values of respective elements of the motion vectors mvL1A, mvL1B, mvL1C of the neighboring blocks A, B, and C in the direction 1 as shown in equation 12.

$$mvpL1X=(\text{Median}[0,8,0], \text{Median}[0,-8,0])=(0,0) \quad \text{[equation 12]}$$

In this process, the motion vector difference dmvL1X is derived as (8, −8) by calculating the difference between the motion vector mvL1X of the block X subject to encoding and the motion vector predictor mvpL1X as shown in equation 12.

$$dmvL1X=mvL1X-mvpL1X=(8-0,-8-0)=(8,-8) \quad \text{[equation 13]}$$

As described above, the block X subject to encoding to which bidirectional prediction has applied has originally a high correlation with the neighboring block B that is a sole neighboring block to which bidirectional prediction has applied in a similar manner. However, there exist another neighboring block that has an identical reference index other than the neighboring block B in case the identity of reference index is determined independently for each prediction direction. Therefore, according to the conventional method for predicting a motion vector, a motion vector predictor is inevitably calculated based on an intermediate value of all of the neighboring blocks for each prediction direction. Thus, an accurate motion vector predictor can not be derived and encoding with reduced redundancy of a motion vector of a block subject to encoding can not be performed.

In this case, even if the identity of motion vector number of the block subject to encoding and of a neighboring block is evaluated by using the method for predicting a motion vector according to the first embodiment or the second embodiment, the second process of predicting a motion vector is executed all the same because there exist two neighboring blocks having a vector number 2 which is identical with that of the block subject to encoding, namely the block A and the block B. This brings the same result with that of the conventional method for predicting a motion vector, thus encoding with reduced redundancy of a motion vector of a block subject to encoding can not be performed.

In order to address such additional problems, method for predicting a motion vector that takes the identity of reference pictures between a block subject to encoding and a neighboring block into account as well as the identity of motion vector numbers therebetween is used according to the third embodiment of the present invention.

A detailed explanation will be given below on the third embodiment of the present invention.

Figure 14:
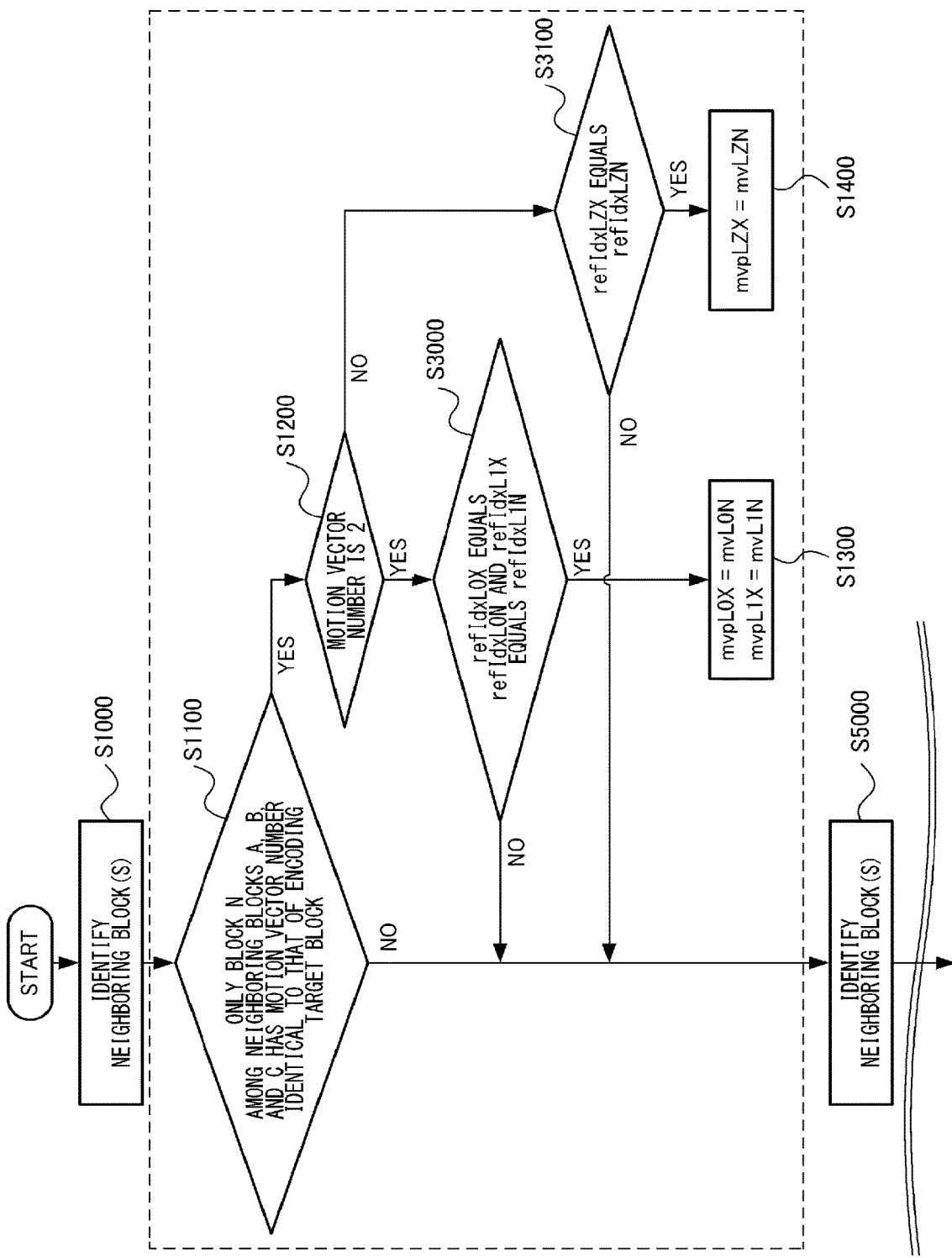
FIG. 14 shows a flowchart for illustrating a method for deriving a motion vector predictor according to a third embodiment in detail.

The configurations of a moving picture encoding device and a moving picture decoding device that use the method for predicting a motion vector according to the third embodiment are same as those of the moving picture encoding device and the moving picture decoding device according to the first embodiment. An explanation will be given on a motion vector encoding unit 170 and a motion vector decoding unit 550 that operate differently from that of the constituting elements of the first embodiment while referring to FIG. 14. In case of the motion vector decoding unit 550, "block subject to encoding" is replaced with "block subject to decoding" in the following explanation.

An explanation will be given on the process of step 1200 and the following steps that is different from that of the first embodiment.

In case that only one neighboring block N that has the motion vector number identical to that of the block X subject to encoding exists, the motion vector predictor derivation unit 240 examines whether the motion vector number of the block X subject to encoding is 2 (step S1200).

If the motion vector number of the block X subject to encoding is 2 (YES in step S1200), the motion vector predictor derivation unit 240 examines whether the reference index refIdxL0X in the direction L0 of the block X subject to encoding is identical to the reference index refIdxL0N of the neighboring block N in the direction L0, and whether the reference index refIdxL1X in the direction L1 of the block X subject to encoding is identical to the reference index refIdxL1N of the neighboring block N in the direction L1 (step S3000).

In case that the requirement of step S3000 is satisfied, the process of step S1300 is executed in a similar manner as that of the first embodiment. That is, the motion vector of the neighboring block N is set as the motion vector predictor of the block X subject to encoding in the both directions (the previous direction L0 and the subsequent direction L1). In case that the requirement of step S3000 is not satisfied, a process of step S000 and the following steps are executed, which is the conventional method for predicting a motion vector.

If the motion vector number of the block X subject to encoding is not 2 (NO in step S1200), the motion vector predictor derivation unit 240 examines whether the reference index refIdxLZX in a single prediction direction Z (the previous direction L0 or the subsequent direction L1) of the block X subject to encoding is identical to the reference index refIdxLZX of the neighboring block N in the direction LZ (step S3100).

In case that the requirement of step S3100 is satisfied, the process of step S1400 is executed in a similar manner as that of the first embodiment. That is, the motion vector of the neighboring block N in the single prediction direction Z is set as the motion vector predictor of the block X subject to encoding. In case that the requirement of step S3100 is not satisfied, a process of step S000 and the following steps are executed, which is the conventional method for predicting a motion vector.

An explanation will be given on advantages of the method for deriving a motion vector predictor according to the third embodiment.

Figure 13:
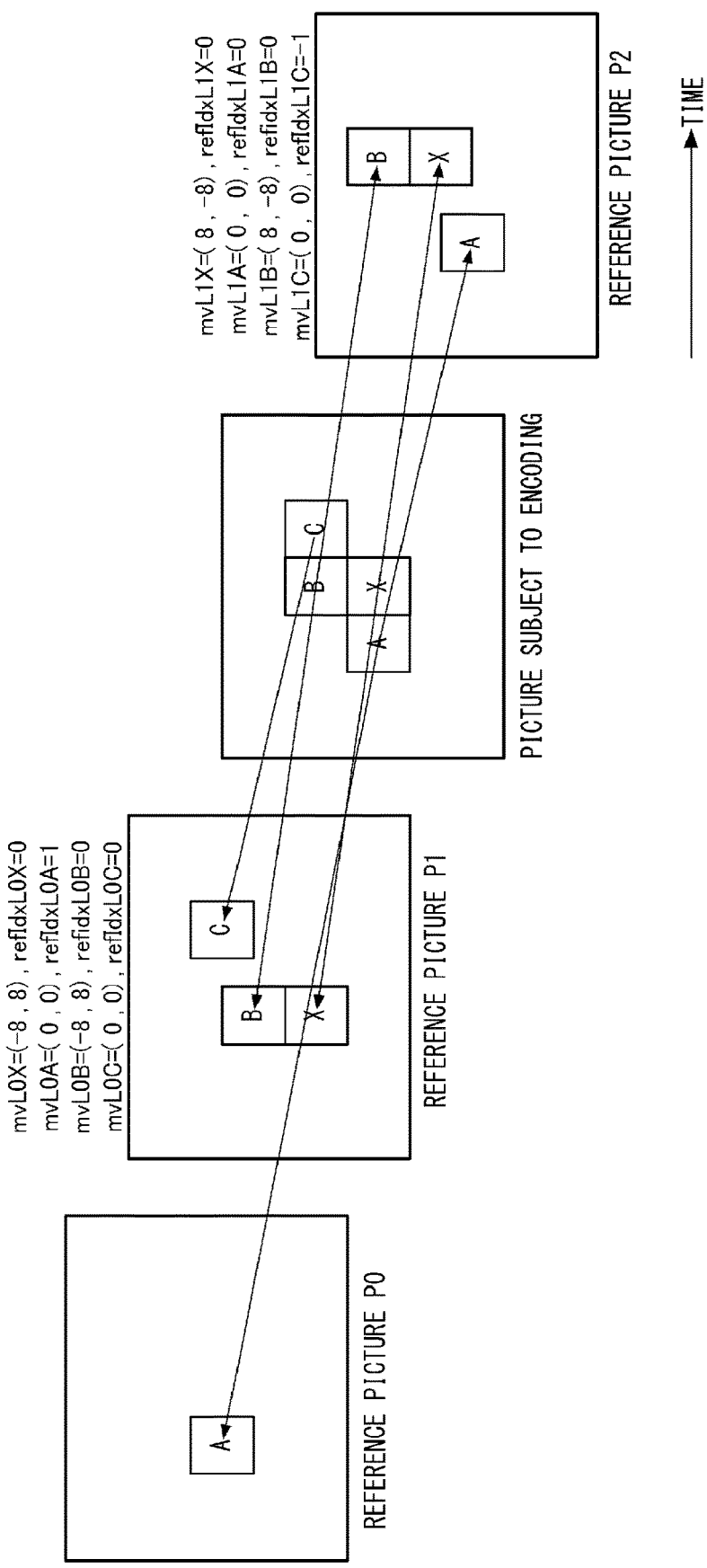
FIG. 13 shows another specific example of the conventional method for predicting a motion vector.

It is assumed that the method for deriving a motion vector predictor according to the third embodiment is applied to the specific example explained by FIG. 13. Although two neighboring blocks, namely the block A and the block B, exist that have the motion vector number 2 identical to that of the block X subject to encoding, only block B has the same reference indices for both directions. Therefore, the motion vector predictors mvpL0X and mvpL1X of the block X subject to encoding are derived from the equation 14 as (−8, 8) and (8, −8), respectively.

$$mvpL0X = mvL0B = (-8,8)$$

$$mvpL1X = mvL1B = (8,-8) \quad \text{[equation 14]}$$

In this process, the motion vector differences dmvL0X and dmvL1X are derived from the equation 15 as (0, 0) and (0, 0), respectively.

$$dmvpL0X = mvL0X - mvpL0X = (-8,8) - (-8,8) = (0,0)$$

$$dmvpL1X = mvL0X - mvpL0X = (8,-8) - (8,-8) = (0,0) \quad \text{[equation 15]}$$

As described above, according to the method for deriving a motion vector predictor of the third embodiment, even in case that a plurality of neighboring blocks exist that have a motion vector number identical to the motion vector number of a block subject to encoding, whether the reference indices of respective prediction directions are identical with each other, that is, whether the reference pictures of the block subject to encoding and the neighboring block are identical with each other is taken into account. This allows derivation of a motion vector predictor according to the original motion and allows encoding with reduced redundancy of the motion vector of the block subject to encoding.

In any one of the embodiments, the number of the neighboring blocks or the position thereof can be set arbitrarily. For general purpose recording media such as a Blu-ray Disk (trademark), or the like, a rather large number of reference pictures in the previous direction L0 are encoded and a rather small number of reference pictures in the subsequent direction L1 are encoded. In such a case, the number of neighboring blocks may be changed depending on the prediction direction. For example, four blocks may be identified in case of the previous direction L0, and two blocks may be identified in case of the subsequent direction L1.

Further, according to any one of the methods for deriving motion vector predictor in the embodiments, by changing the method to identifying a neighboring block between the first motion vector predictor derivation process in the preceding step and the second motion vector predictor derivation process in the following step (i.e., conventional method for deriving a motion vector predictor), a method for identifying a neighboring block can be selected appropriately in accordance with the degree of accuracy of the motion vector predictor derivation or the throughput.

A bitstream of moving pictures output from the moving picture encoding device according to the embodiments described above has a specific data format so that the data stream can be decoded in accordance with the coding method used in the embodiments. A moving picture decoding device corresponding to the moving picture encoding device can decode the bitstream in this specific format.

In case that a wired or wireless network is used in order to exchange bitstreams between the moving picture encoding device and the moving picture decoding device, a bitstream may be transformed into a data format appropriate to the manner of transmission on the communication path so as to be transmitted. In this case, a moving picture transmission device and a moving picture receiver device are provided. The moving picture transmission device transforms a bitstream output from the moving picture encoding device into encoded data in a data format appropriate to the manner of transmission via the communication path and transmits the encoded data to the network. The moving picture receiver device receives encoded data from the network, reconstructs a bitstream, and provides the bitstream to the moving picture decoding device.

The moving picture transmission device includes a memory that buffers a bitstream output from the moving picture encoding device, a packet processing unit that packetizes the bitstream, a transmission unit that transmits the packetized bitstream via a network. The moving picture receiver device includes a receiving unit that receives a packetized bitstream via a network, a memory that buffers the received bitstream, and a packet processing unit that processes a packet of the encoded data so as to generate a bitstream, and provides the bitstream to the moving picture decoding device.

It is needless to mention that the processes relating to encoding and decoding described above can be implemented as a transmission device, a storage, and/or a receiver device using hardware. The process can also be implemented by firmware stored in a read only memory (ROM), a flash memory, or the like, or by software of computers or the like. The firmware program or the software program can be stored in a recording medium readable by a computer or the like and provided, can be provided from a server via a wired or wireless network, or can be provided by data broadcasting as terrestrial broadcasting or satellite digital broadcasting.

Given above is an explanation based on the embodiments. The embodiments are intended to be illustrative only and it will be obvious to those skilled in the art that various modifications to constituting elements and processes could be developed and that such modifications are also within the scope of the present invention.

What is claimed is:

1. A moving picture coding device adapted to encode a bitstream using motion compensation prediction in units of blocks obtained by partitioning each picture of moving pictures, comprising:
   a motion information derivation unit configured to derive a first direction motion vector and a second direction motion vector of a block subject to coding on a basis of a first direction motion vector and a second direction motion vector of a selected neighboring block selected from spatial neighboring blocks of the block subject to coding;
   a motion compensation prediction unit configured to generate a predicted value of the block subject to coding by motion compensation prediction using the first direction motion vector and the second direction motion vector derived by the motion information derivation unit; and
   a motion information storage unit configured to store the first direction motion vector and the second direction motion vector derived by the motion information derivation unit, wherein the motion information derivation unit is further configured to set a candidate block from the selected neighboring block based on whether:
a first reference index indicating a first reference picture referred to by the first direction motion vector of the block subject to coding and a second reference index indicating a second reference picture referred to by the first direction motion vector of the selected neighboring block are identical with each other; and
a third reference index indicating a third reference picture referred to by the second direction motion vector of the block subject to coding and a fourth reference index indicating a fourth reference picture referred to by the second direction motion vector of the selected neighboring block are identical with each other.

2. A moving picture coding method adapted to encode a bitstream using motion compensation prediction in units of blocks obtained by partitioning each picture of moving pictures, comprising:
deriving a first direction motion vector and a second direction motion vector of a block subject to coding on a basis of a first direction motion vector and a second direction motion vector of a selected neighboring block selected from spatial neighboring blocks of the block subject to coding;
generating a predicted value of the block subject to coding by motion compensation prediction using the first direction motion vector and the second direction motion vector derived by the deriving; and
storing the first direction motion vector and the second direction motion vector derived by the deriving,
wherein the deriving is further configured to set a candidate block from the selected neighboring block based on whether:
a first reference index indicating a first reference picture referred to by the first direction motion vector of the block subject to coding and a second reference index indicating a second reference picture referred to by the first direction motion vector of the selected neighboring block are identical with each other; and
a third reference index indicating a third reference picture referred to by the second direction motion vector of the block subject to coding and a fourth reference index indicating a fourth reference picture referred to by the second direction motion vector of the selected neighboring block are identical with each other.

3. A non-transitory computer-readable recording medium having embodied thereon a moving picture coding program executable by a computer and adapted to encode a bitstream using motion compensation prediction in units of blocks obtained by partitioning each picture of moving pictures, the program comprising:
a deriving module configured to derive a first direction motion vector and a second direction motion vector of a block subject to coding on a basis of a first direction motion vector and a second direction motion vector of a selected neighboring block selected from spatial neighboring blocks of the block subject to coding;
a generating module configured to generate a predicted value of the block subject to coding by motion compensation prediction using the first direction motion vector and the second direction motion vector derived by the deriving module; and
a storing module configured to store the first direction motion vector and the second direction motion vector derived by the deriving module, wherein the deriving module is further configured to set a candidate block from the selected neighboring block based on whether:
a first reference index indicating a first reference picture referred to by the first direction motion vector of the block subject to coding and a second reference index indicating a second reference picture referred to by the first direction motion vector of the selected neighboring block are identical with each other; and
a third reference index indicating a third reference picture referred to by the second direction motion vector of the block subject to coding and a fourth reference index indicating a fourth reference picture referred to by the second direction motion vector of the selected neighboring block are identical with each other.

4. A moving picture decoding device adapted to decode a bitstream encoded by using motion compensation prediction in units of blocks obtained by partitioning each picture of moving pictures, comprising:
a motion information derivation unit configured to derive a first direction motion vector and a second direction motion vector of a block subject to decoding on a basis of a first direction motion vector and a second direction motion vector of a selected neighboring block selected from spatial neighboring blocks of the block subject to decoding;
a motion compensation prediction unit configured to generate a predicted value of the block subject to decoding by motion compensation prediction using the first direction motion vector and the second direction motion vector derived by the motion information derivation unit; and
a motion information storage unit configured to store the first direction motion vector and the second direction motion vector derived by the motion information derivation unit,
wherein the motion information derivation unit is further configured to set a candidate block from the selected neighboring block based on whether:
a first reference index indicating a first reference picture referred to by the first direction motion vector of the block subject to decoding and a second reference index indicating a second reference picture referred to by the first direction motion vector of the selected neighboring block are identical with each other, and
a third reference index indicating a third reference picture referred to by the second direction motion vector of the block subject to decoding and a fourth reference index indicating a fourth reference picture referred to by the second direction motion vector of the selected neighboring block are identical with each other.

5. A moving picture decoding method adapted to decode a bitstream encoded by using motion compensation prediction in units of blocks obtained by partitioning each picture of moving pictures, comprising:
deriving a first direction motion vector and a second direction motion vector of a block subject to decoding on a basis of a first direction motion vector and a second direction motion vector of a selected neighboring block selected from spatial neighboring blocks of the block subject to decoding;
generating a predicted value of the block subject to decoding by motion compensation prediction using the first direction motion vector and the second direction motion vector derived by the deriving; and
storing the first direction motion vector and the second direction motion vector derived by the deriving, wherein the deriving is further configured to set a candidate block from the selected neighboring block based on whether:

a first reference index indicating a first reference picture referred to by the first direction motion vector of the block subject to decoding and a second reference index indicating a second reference picture referred to by the first direction motion vector of the selected neighboring block are identical with each other, and a third reference index indicating a third reference picture referred to by the second direction motion vector of the block subject to decoding and a fourth reference index indicating a fourth reference picture referred to by the second direction motion vector of the selected neighboring block are identical with each other.

6. A non-transitory computer-readable recording medium having embodied thereon a moving picture decoding program executable by a computer and adapted to decode a bitstream encoded by using motion compensation prediction in units of blocks obtained by partitioning each picture of moving pictures, the program comprising:

a deriving module configured to derive a first direction motion vector and a second direction motion vector of a block subject to decoding on a basis of a first direction motion vector and a second direction motion vector of a selected neighboring block selected from spatial neighboring blocks of the block subject to decoding;

a generating module configured to generate a predicted value of the block subject to decoding by motion compensation prediction using the first direction motion vector and the second direction motion vector derived by the deriving module; and a storing module configured to store the first direction motion vector and the second direction motion vector derived by the deriving module, wherein the deriving module is further configured to set a candidate block from the selected neighboring block based on whether:

a first reference index indicating a first reference picture referred to by the first direction motion vector of the block subject to decoding and a second reference index indicating a second reference picture referred to by the first direction motion vector of the selected neighboring block are identical with each other, and a third reference index indicating a third reference picture referred to by the second direction motion vector of the block subject to decoding and a fourth reference index indicating a fourth reference picture referred to by the second direction motion vector of the selected neighboring block are identical with each other.

* * * * *